(12) United States Patent
Raj S V et al.

(10) Patent No.: US 11,698,872 B2
(45) Date of Patent: Jul. 11, 2023

(54) INTERFACING WITH SYSTEMS, FOR PROCESSING DATA SAMPLES, AND RELATED SYSTEMS, METHODS AND APPARATUSES

(71) Applicant: Microchip Technology Incorporated, Chandler, AZ (US)

(72) Inventors: Narendra Raj S V, Karnataka (IN); Priyank Gupta, Chandler, AZ (US); Michael Simmons, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 17/457,185

(22) Filed: Dec. 1, 2021

(65) Prior Publication Data
US 2022/0092006 A1    Mar. 24, 2022

Related U.S. Application Data

(62) Division of application No. 16/258,171, filed on Jan. 25, 2019, now Pat. No. 11,221,976.

(51) Int. Cl.
*G06F 13/16* (2006.01)
*G06F 3/06* (2006.01)
(Continued)

(52) U.S. Cl.
CPC .......... *G06F 13/1673* (2013.01); *G06F 3/061* (2013.01); *G06F 3/0631* (2013.01);
(Continued)

(58) Field of Classification Search
CPC ...... G06F 3/0631; G06F 13/1673; G06F 5/06; G06F 3/06; G06F 13/28; G06F 3/647
(Continued)

(56) References Cited

U.S. PATENT DOCUMENTS 4,763,203 A    8/1988 Oldershaw et al.
6,021,132 A    2/2000 Muller et al.
(Continued)

FOREIGN PATENT DOCUMENTS

EP        0438274 A2    7/1991

OTHER PUBLICATIONS

International Search Report for International Application No. PCT/US2020/013213, dated Jun. 23, 2020, 7 pages.
(Continued)

*Primary Examiner* — Christopher B Shin
(74) *Attorney, Agent, or Firm* — TraskBritt

(57) ABSTRACT

Disclosed examples include an apparatus. The apparatus may include first interfaces, second interfaces, a bus interface, and a buffer interface. The first interfaces may be to communicate at first data widths via first interconnects for operable coupling with data samples sources. The second interface may be to communicate at second data widths via second interconnects for operable coupling with data sinks. The buffer interface may be to communicate with a system to process data samples sampled using different sampling rates according to processing frame durations. The buffer interface may include an uplink channel handler and a downlink channel handler. The uplink channel handler may be to receive data samples from the first interfaces at first data widths and provide the data samples to the bus interface at third data widths. The downlink channel handler may be to receive processed data samples from the bus interface at third data widths and provide the processed data samples to the second interfaces at second data widths. The bus interface to communicate at a third data width via a third interconnect for operative coupling with allocated memory region utilized by the system to process data samples.

17 Claims, 14 Drawing Sheets

(51) Int. Cl.
*G06F 5/06* (2006.01)
*G06F 13/28* (2006.01)

(52) U.S. Cl.
CPC .......... *G06F 3/0647* (2013.01); *G06F 3/0679* (2013.01); *G06F 5/06* (2013.01); *G06F 13/28* (2013.01)

(58) Field of Classification Search
USPC .......................................................... 710/52
See application file for complete search history.

(56) References Cited

U.S. PATENT DOCUMENTS

| | | | |
|---|---|---|---|
| 6,327,249 B1 | 12/2001 | Cookman et al. | |
| 6,643,746 B1 | 11/2003 | Bouquet | |
| 7,302,396 B1 | 11/2007 | Cooke | |
| 2003/0037218 A1* | 2/2003 | Gurney | G06F 9/3455 712/E9.039 |
| 2006/0034301 A1* | 2/2006 | Anderson | H04L 69/18 370/401 |
| 2015/0026309 A1 | 1/2015 | Radcliffe et al. | |
| 2015/0172705 A1 | 6/2015 | Lee et al. | |
| 2016/0357481 A1 | 12/2016 | Nam et al. | |
| 2018/0167649 A1 | 6/2018 | Hayakawa | |
| 2018/0203666 A1 | 7/2018 | Okumura et al. | |
| 2019/0013028 A1 | 1/2019 | Atti et al. | |
| 2020/0287698 A1 | 9/2020 | Jiao et al. | |

OTHER PUBLICATIONS

International Written Opinion for International Application No. PCT/US2020/013213, dated Jun. 23, 2020, 20 pages.

* cited by examiner

INTERFACING WITH SYSTEMS, FOR PROCESSING DATA SAMPLES, AND RELATED SYSTEMS, METHODS AND APPARATUSES

CROSS-REFERENCE TO RELATED APPLICATION

This application is a divisional of U.S. patent application Ser. No. 16/258,171, filed Jan. 25, 2019, now U.S. Patent 11,221,976, issued Jan. 11, 2022, the disclosure of which is hereby incorporated herein in its entirety by this reference.

TECHNICAL FIELD

The present disclosure relates, generally, to digital signal processing, and some embodiments more specifically relate to moving data samples to, and from, system memory of a digital signal processor.

BACKGROUND

Digital signal processors (DSP(s)) are microprocessors that are optimized for digital signal processing. In a typical use case, source signals are converted from analog to digital, processed digitally by a DSP, and then converted back to analog. For many applications, DSPs are required to quickly perform a large number of operations on many data samples (e.g., in terms of operations per second or processed data samples per second), and require a large memory bandwidth for their computations.

In order to meet the requirements for specific applications, DSP platforms are often customized to a specific application or categories of applications. Some applications require both a DSP as well as a microcontroller, for example, motor control and power supplies, audio processing, video processing, wireless signal filtering, pre-processing signals for software-defined radio modems. Each DSP platform itself may involve standards and protocols that affect the data bus bandwidth. For example, DSP platforms use a variety of bus architectures and interface protocols, such as APB (Advanced Peripheral Bus), AMBA (Advanced Microcontroller Bus Architecture), AXI (Advanced eXtensible Interface), AHB (AMBA High-performance Bus or "AMBA2"), and more. Moreover, DSPs within an application family often use, and are designed for, certain algorithms to process data samples and operate using specific data frame sizes.

More and more, the applications for which DSP platforms are used require interfacing with a variety of systems. These systems may use a variety of sample widths and sampling rates.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

Figure 1A:
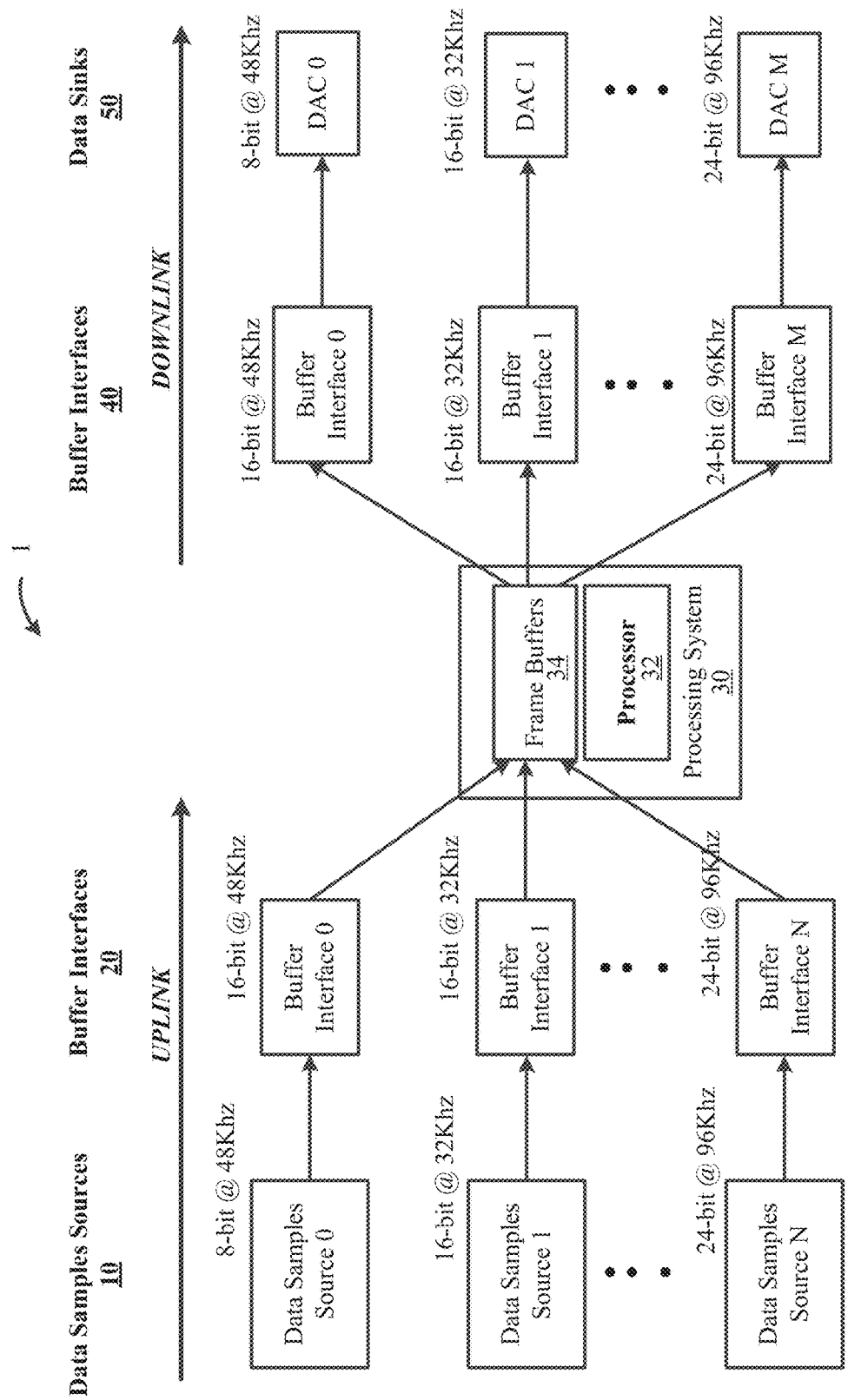
FIG. 1A is a functional block diagram of a data transport system, in accordance with one or more embodiments of the disclosure.

In the following detailed description, reference is made to the accompanying drawings, which form a part hereof, and in which are shown, by way of illustration, specific example embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

It will be readily understood that the components of the embodiments as generally described herein and illustrated in the drawings may be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

Thus, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Information and signals described herein may be represented using any of a variety of different technologies and techniques. For example, data, instructions, commands, information, signals, bits, and symbols that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the disclosure may be implemented on any number of data signals including a single data signal.

It should be understood that any reference to an element herein using a designation such as "first," "second," and so forth does not limit the quantity or order of those elements, unless such limitation is explicitly stated. Rather, these designations are used herein as a convenient method of distinguishing between two or more elements or instances of an element. Thus, a reference to first and second elements does not mean that only two elements can be employed or that the first element must precede the second element in some manner. Also, unless stated otherwise a set of elements may comprise one or more elements. Likewise, sometimes elements referred to in the singular form may also include one or more instances of the element.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field-Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer when the general-purpose computer is configured to execute computing instructions (e.g., software code) related to embodiments of the present disclosure.

Also, it is noted that the embodiments may be described in terms of a process that is depicted as a flowchart, a flow diagram, a structure diagram, or a block diagram. Although a flowchart may describe operational acts as a sequential process, many of these acts may be performed in another sequence, in parallel, or substantially concurrently. In addition, the order of the acts may be re-arranged. A process may correspond to a method, a thread, a function, a procedure, a subroutine, or a subprogram, without limitation. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Some conventional DSP platforms known to the inventors of this disclosure use re-sampling techniques (e.g., a combination of interpolation and decimation) to change a sample-rate of data samples in order to better fit a data-transport scheme, however, implementing a range of re-sampling filters that operate over a sufficient range of sampling rates has drawbacks. For example, if implemented in hardware, then resample filters consume area, power and also degrade the original signal as resample filters do not perfectly re-sample the original signal from one sample rate to another. If implemented in the software, there is still an issue of signal quality; moreover, software implementations require additional MIPS (i.e., "Microprocessor without Interlocked Pipelined Stages") and code area to implement these re-samplers.

Another technique for addressing variability is to use channel buffers to hold data samples and then a DSP reads the data samples from the channel buffers sample by sample. One drawback of this technique is that the DSP may be interrupted each time it reads a sample. The higher the sampling-rate, the more frequently the DSP is interrupted, which degrades the DSPs performance of its core signal processing functions. Further, if a transport-scheme implements buffer-sharing (where multiple channels share the same channel buffers), re-sampling filters typically have to be used to match all of the sample rates and then accumulate the samples to send to a processor, because transport schemes, generally, cannot handle variable sample widths.

As used in this disclosure, "channel" means a path of communication, electrical, electromagnetic, or a combination of electrical and electromagnetic segments, between two or more points.

As used in this disclosure, "uplink" means at least part of a channel from a point to one or more frame buffers. As used in this disclosure, "downlink" means at least part of a channel from one or more frame buffers to a point. As a matter of convention, a frame buffer that receives data samples may be referred to herein as an input frame buffer, and a frame buffer from which processed data sample are received may be referred to herein as an output frame buffer. An output frame buffer may be the same (i.e., same allocated memory space) input frame buffer that received the data samples that were processed, or it may be a different (i.e., not same allocated memory space) frame buffer than the input frame buffer that received the data samples that were processed.

As used in this disclosure, "width" when used to modify another term, for example "sample width," "interface width," means bit width.

One or more embodiments of the disclosure relate, generally, to allocating a number of frame buffers in system memory of a processing system, and then moving data samples between the frame buffers and one or more data paths by way of buffer interfaces that are configured to read and write to and from the frame buffers as well as the one or more data paths. The frame buffers correspond to processing frames—the size of which, when measured in terms of time, is referred to herein as a "processing frame duration." Processing frames include a requisite number of samples for a processing algorithm. The buffer interfaces are configurable and reconfigurable for communicating data samples based, at least in part, on uplink and downlink configuration parameters.

FIG. 1A shows is a functional block diagram of a data transport system 1 including N data samples sources 10, N buffer interfaces 20, processing system 30, M buffer interfaces 40, and M data sinks 50, in accordance with one or more embodiments of the disclosure. In the embodiment shown in FIG. 1, on the uplink side the data samples sources 10 operate at different sampling rates and bit widths, and send data samples to the processing system 30 by way of respective buffer interfaces 20. Buffer interfaces 20 receive the data samples at the different sampling rates and the different bit widths and output buffered data samples at different sampling rates and the uniform bit width. Buffer interface 20 performs bandwidth alignment (i.e., adapts data samples received at a first channel for communication at a second channel, where the first channel and the second channel have different maximum bit rates) between channels from the data samples sources 10 to the buffer interfaces 20 and the channel to processing system 30, as well as adapts the data size, i.e., bit width, to the size used by the processing system 30. Processing system 30 receives the pre-processed data samples at different sample rates and uniform bit width. The term bit width is not meant to be limited to a case of parallel data bits, and the use of serial data with a word length, wherein the word length is the bit width is specifically contemplated. FIG. 1A depicts frame buffers 34 and processor 32 of processing system 30.

On the downlink side the processing system 30 sends processed data samples to data sinks 50. In this embodiment, the data sinks 50 are shown as digital-to-analog converters (DACs), but the disclosure is not so limited. Processing system 30 sends the processed data samples at different sampling rates and uniform bit width to buffer interfaces 40. Each buffer interface of buffer interfaces 40 receives processed data samples at a sampling rate and bit width and output buffered processed data samples at respective different sampling rates and respective different bit widths. Buffer interfaces 40 perform bandwidth alignment between channels from the processing system 30 to the buffer interfaces 40 and channels from the buffer interfaces 40 to the data sinks 50, and adapts the bit widths of the processed data samples to the bit width used by the various data sinks 50. More detail about elements of system 1 is provided elsewhere in this disclosure.

Figure 1B:
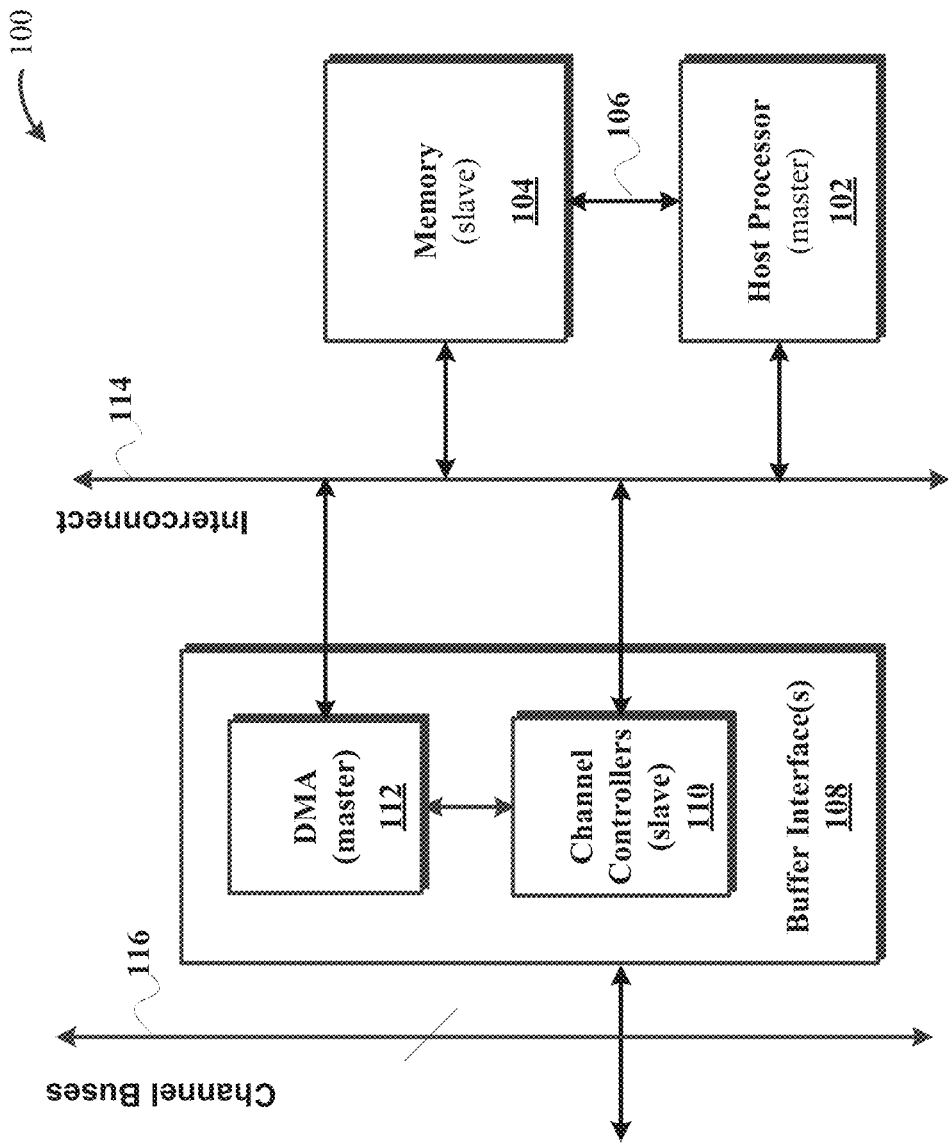
FIG. 1B is a simplified block diagram of a computing system usable in the data transport scheme of FIG. 1A.

FIG. 1B is a simplified block diagram of a computing system 100 including host processor 102, memory 104 (e.g., SRAM), channel controllers 110, and direct memory access (DMA) controller 112. As non-limiting examples, computing system 100 may be a microcontroller-type embedded system, a user-type computer, a file server, a compute server, a notebook computer, a tablet, a handheld device, a mobile device, a wireless earbud device or headphone device, a wired earbud or headphone device, other similar computer systems for executing software. Computer, computing system, and server may be used interchangeably herein to indicate a system for practicing embodiments of the present disclosure. Computing system 100 is configured for executing software programs containing computing instructions and may include one or more processors, memory, storage, user interface elements, one or more communication elements, and combinations thereof.

The host processor 102 is a central processing unit (CPU) that may be configured to execute a wide variety of operating systems and applications including computing instructions for carrying out all or portions of embodiments of the present disclosure. Host processor 102 may be a single or multi core processor, and the core or cores may be any combination of specific purpose (e.g., DSP) and general purpose, configured and/or programmed to perform one or more of the functions described in this disclosure. In multi-core embodiments, the cores may operate independently and inter-dependently, including, without limitation, in a master slave arrangement.

The memory 104 may be used to hold computer instructions, data structures, and other information for performing a wide variety of tasks including performing embodiments of the present disclosure. As non-limiting examples, the memory 104 may include synchronous random access memory (SRAM), dynamic RAM (DRAM), read-only memory (ROM), Flash memory, and the like.

The memory 104 may include other types of memory devices, including volatile storage devices or non-volatile storage devices, configured to store information. Examples of other types of memory include nano-RAM (NRAM), nanocrystal wire-based memory, silicon-oxide based sub-10 nanometer process memory, graphene memory, Silicon-Oxide-Nitride-Oxide-Silicon (SONOS), resistive random-access memory (RRAM), programmable metallization cell (PMC), conductive-bridging RAM (CBRAM), magneto-resistive RAM (MRAM), phase change RAM (PCRAM), phase change memory, or other solid-state storage media.

In the embodiment shown in FIG. 1B, host processor 102 communicates with memory 104 on an interconnect 106 that enables relatively low-latency communication. For example, memory 104 may be tightly coupled memory (TCM), cache type memory, or a combination of TCM memory and cache memory—e.g., implemented in parallel, and interconnect 106 may be a direct connection between processor 102 and memory 104 or a data bus to which they are both operatively coupled.

Host processor 102 and memory 104 communicate with DMA controller 112 and channel controllers 110 over interconnect 114. In the embodiment shown in FIG. 1B, interconnect 114 is a bus, chipset, switch, or network on chip, without limitation, that provides point-to-point connections according to Advanced eXtensible Interface (AXI). In other embodiments, interconnect 114 may be implemented as a bus such as an advanced system bus (ASB), advanced peripheral bus (APB), or advanced high-performance bus (AHB).

In the embodiment shown in FIG. 1B, memory 104 is directly accessible to host processor 102 and DMA controller 112, which are both operatively coupled to master type ports of interconnect 114. Memory 104 is accessible to channel controllers 110 by way of DMA controller 112, which may be configured to grant read/write access to memory 104 to channel controllers 110. Memory 104 is operatively coupled to a slave type port of interconnect 114.

Channel controllers 110 may communicate with devices over a number of buses labeled as channel buses 116 in FIG. 1B. By way of example, DMA controller 112 and channel controllers 110 may be implemented in hardware, software, or combinations thereof (e.g., combinational logic, a slave core to a master core at processor 102, without limitation). The DMA controller 112 and channel controllers 110 may be referred to collectively as a buffer interface 108.

Many other system configurations are possible for embodiments of the present disclosure, and will be apparent to one having ordinary skill in the art. For example, separate/additional buses (data, address, instruction, memory, etc.) may be included for communication among devices in computing system 100.

Figure 1C:
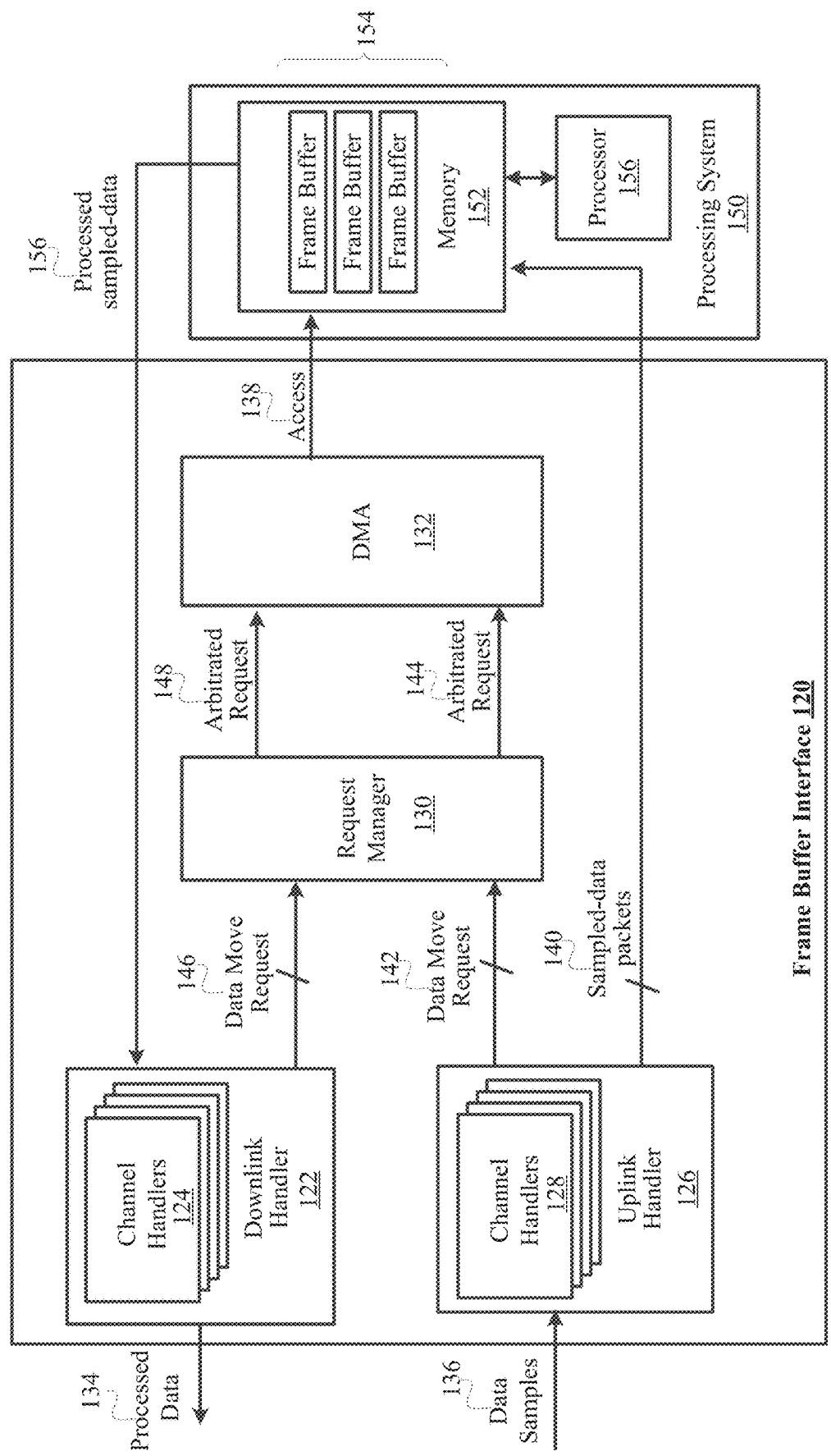
FIG. 1C is a functional block diagram of a frame buffer interface, in accordance with one or more embodiments of the disclosure.

FIG. 1C is a functional block diagram of a frame buffer interface 120 configured, generally, to move data samples to, and from, frame buffers 154 defined in memory 152 of a processing system 150, in accordance with one or more embodiments of the disclosure. While the elements of processing system 150 are shown in FIG. 1C, that is not intended to mean that infringement of a frame buffer interface of this disclosure requires any of the elements of processing system 150, including frame buffers 154. Uplink handler 126 and downlink handler 122 may each be configured as controllers that operates in conjunction with DMA controller 132 for uplink and downlink paths, and also includes buffering and packing/unpacking of data samples to fill in an AXI bus.

In one or more embodiments, buffer interface 120 includes downlink handler 122, uplink handler 126, request manager 130, and DMA controller 132. Generally, uplink handler 126 receives data samples 136 and provides data samples packets 140. More particularly, uplink handler 126 is configured to collect data samples 136 on each of a plurality of channels, pack the data samples 136 into packets, and provide data samples packets 140, as well as monitor the frame buffers 154.

Uplink handler 126 may include a number of uplink channel handlers 128 that are configured to handle data samples for specific uplink channels. Uplink handler 126 is configured to notify DMA controller 132 that data samples packets 140 are ready to be sent and written to one or more frame buffers 154 in memory 152.

In one or more embodiments, DMA controller 132 is configured, generally, to manage read/write access to memory 152, and more particularly, DMA controller 132 manages read/write access to one or more frame buffers 154 of memory 152 responsive to data move requests 142, after optional arbitration by request manager 130, to be described further below. In one embodiment, data move requests 142 may describe input frame buffers of frame buffers 154 for the data samples packets 140 (e.g., by using address pointers). In another embodiment, data move requests 142 may describe uplink channels and DMA controller 132 is configured to reference a table that associates particular input frame buffers with particular uplink channels and move samples using various DMA techniques. As an example of DMA techniques that may be implemented by DMA controller 132, DMA controller 132 may be configured to collate samples from each channel (or more specifically, from uplink controllers) and then perform burst transfers to processing system 150 and frame buffers 154 more specifically. In a case where an AXI bus is used to move data samples to processing system 150, then, by way of example, a FIXED burst (i.e., where a next address pointer is not changed, for example, with an address fixed I/O port) or increment burst (i.e., where a next address pointer is incremented by a data size to point at a next address location in memory) may be used.

Buffer interface 120 may be configured to move data samples 136 for multiple channels to memory 152 sequentially or in parallel, as long as there is valid data at the uplink channel handlers 128 to move. The rate at which the data samples have to be moved per channel can also be controlled using the input sample rate at 136.

Uplink channel handlers 128 may request write access to memory 152 for a number of uplink channels contemporaneously or near contemporaneously. So, in one or more embodiments, buffer interface 120 may include request manager 130, which is configured to arbitrate (i.e., select from among a number of requests according to a priority) among multiple data move requests 142 for moving data samples packets 140 from a plurality of channels and generate arbitrated uplink move requests 144 to DMA controller 132. Request manager 130 may arbitrate responsive to any suitable arbitration algorithm as long as the transfer time from when data samples is received at uplink handler 126 to when data samples packets 140 are received at frame buffers at the memory 152, occurs within an acceptable transfer time window—that is, for transfer to be timely enough to ensure data sanity individual memory writes have to finish within 1/sample rate.

In one or more embodiments, downlink handler 122 is configured, generally, to move processed data samples 134 from processing system 150 to one or more destination data paths. Downlink handler 122 is configured to monitor processing system 150 (or be notified by processing system 150), and when data samples has been processed, provides a downlink data move request 146 to DMA controller 132 via optional request manager 130.

DMA controller 132 manages read access 138 to memory 152 responsive to the downlink data move request 146, and the processed data samples 156 is read from memory 152 of processing system 150. Downlink handler 122 may move data for multiple channels in sequence or in parallel, so, as with uplink data move requests 142, request manager 130 may be configured to arbitrate among multiple downlink data move requests 146 and generate arbitrated downlink move requests 148 to DMA controller 132.

In one embodiment, processed data samples 156 are stored in a same frame buffer of memory 152 where data samples were received prior to processing. In another embodiment, processed data samples 156 are stored in different frame buffers of memory 152 than the frame buffers where data samples were received prior to processing. Among other advantages, using different frame buffers for receiving data samples and for providing processed data samples enables uplink and downlink channels to be active at the same time—e.g., downlink does not have to be coordinated with uplink. A frame buffer for receiving data samples may be characterized herein as an "input frame buffer," and a frame buffer for providing processed data samples may be characterized herein as an "output frame buffer."

Downlink handler 122 may include one or more downlink channel handlers 124 that are configured to handle processed data samples 156. Downlink channel handlers 124 may handle processed data samples 156 responsive to one or more downlink configuration parameters that define one or more of the sampling rate, sample width, and number of samples, without limitation, that are expected by a data samples sink, such as data sinks 50. In some cases the downlink sampling rate and sample width may be the same as the data samples source that generated the data samples, but these parameters do not have to be the same, and different sampling rates and sample widths may be used for downlink than were used for uplink.

Example uplink handlers and example downlink handlers, including of uplink handler 126 and downlink handler 122, are described with reference to FIGS. 2A and 2B.

Figure 2A:
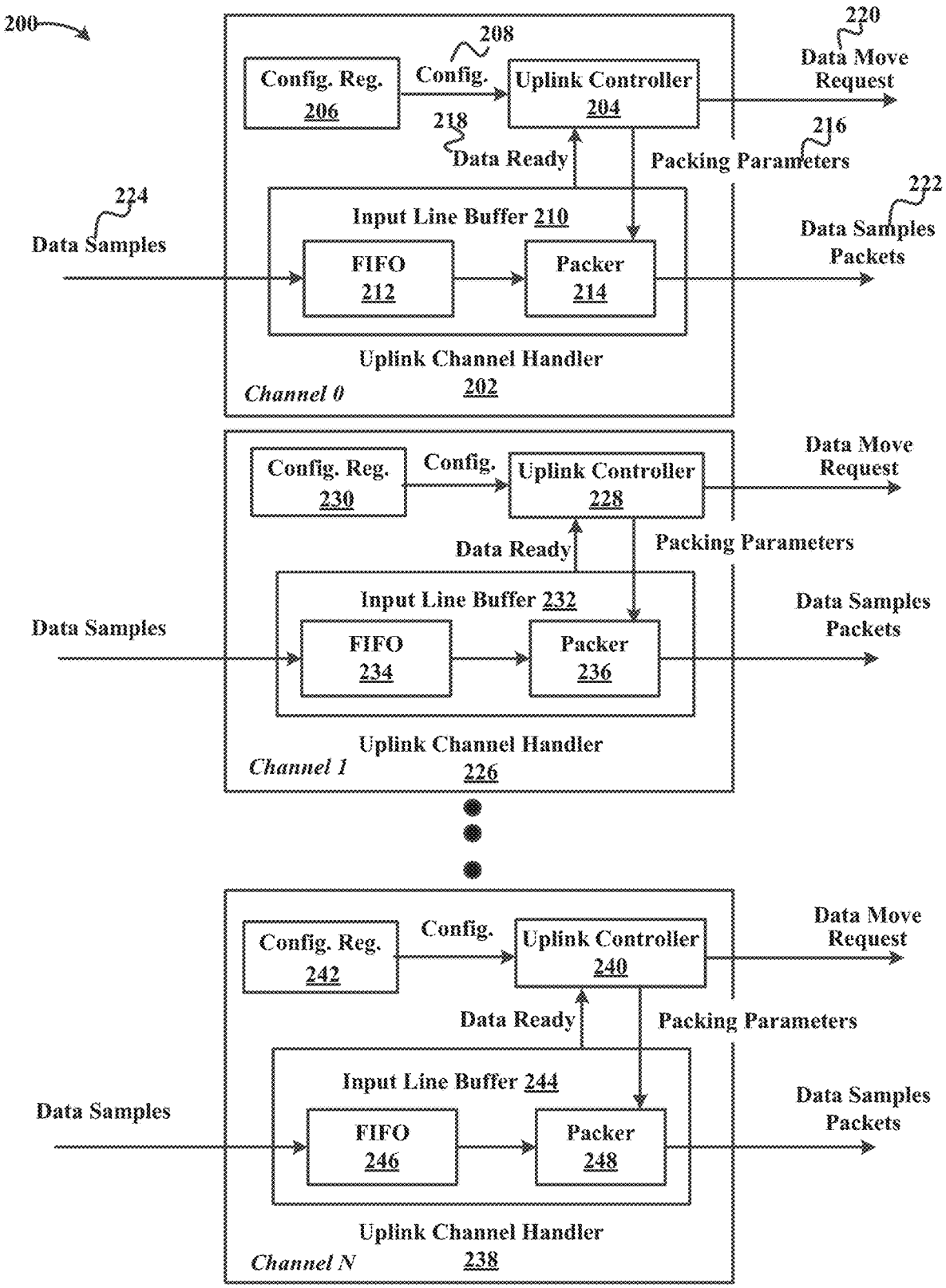
FIG. 2A is a functional block-diagram of a system of uplink handlers, in accordance with one or more embodiments of the disclosure.

FIG. 2A is a functional block-diagram of a system 200 of uplink channel handlers 202, 226 and 238, in accordance with one or more embodiments of the disclosure. Uplink channel handlers 202, 226 and 238 may be configured, generally, to configure constituent input line buffers (e.g., input line buffers 210, 232, and 244), monitor states (e.g., vacant, full, accessible, inaccessible, etc.) of input frame buffers, and notify a processing system (e.g., processing system 150) that input frame buffers are full (or near full) of data samples that may be processed.

In an example embodiment shown in FIG. 2A, system 200 includes N uplink channel handlers, more specifically, uplink channel handlers 202, 226, and 238. Uplink channel handler 202 includes uplink controller 204, configuration register 206, and input line buffer 210. Uplink channel handler 226 includes uplink controller 228, configuration register 230, and input line buffer 232. Uplink channel handler 238 includes uplink controller 240, configuration register 242, and input line buffer 244. Each uplink channel handler 202, 226, 238 is configured to receive data samples and may be operatively coupled to one or more sources of data samples (e.g., as shown in FIG. 1A). Each uplink channel handler 202, 226, and 238 is associated with a different uplink channel.

In one or more embodiments, input line buffers 210, 232, and 244 may be configured, generally, to match different bandwidths of input channels (i.e., for receiving data samples) to bandwidths of input frame buffer channels (i.e., channels for moving data samples to frame buffers), as well as adapt sizes of data samples arriving on input channels to expected sizes for input frame buffer channels and/or data samples received at frame buffers.

In the example embodiment shown in FIG. 2A, each uplink channel handler 202, 226, and 238 is configured to handle one input channel, in other words, there is a one-to-one correspondence of a number of uplink channel handlers and a number of uplink channels (here, N). However, this is not a requirement, and an uplink channel handler may be configured to handle more than one input channel, for example, an uplink channel handlers may be configured to handle data sampled according to a certain sampling rate. By way of another example, an embodiment is specifically contemplated that configuration registers may store sets of configuration parameters for handling multiple input channels, and one uplink channel handler may be configured to handle data samples from multiple input channels (including all input channels in a data transport system) using the sets of configuration parameters.

In the example embodiment shown in FIG. 2A, input line buffers 210 includes N input line buffers, including input line buffer 210, input line buffer 232, and input line buffer 244, each associated with (i.e., operable to couple and/or receive data samples from) channels 0, channel 1, and channel N, respectively.

Each input line buffer 210, 232, and 244 may be configured, generally, to receive, store, and modify data samples. In one or more embodiments, input line buffers 210, 232, and 244 may include first-in-first-out (FIFO) buffers 212, 234, and 246, respectively, and packers 214, 236, and 248, respectively.

Packers 214, 236 and 248 may be configured, generally, to perform packing operations, and more specifically, to pack bits of data samples stored at FIFOs 212, 234, and 246, respectively, into one or more bit locations of frames of data packets. In one embodiment, packers 214, 236 and 248 may pack data samples responsive to packing parameters (e.g., packing parameters 216) received from uplink controllers 204. In another embodiment, uplink controllers 204, 228, and 240 may configure packers 214, 236, and 248, respectively, responsive to packing parameters (e.g., packing parameters 216).

Packing parameters for a given channel may include, for example, at least a sample width and a bus interface width. A sample width may correspond to the output width of a device, such as an analog-to-digital converter (ADC) that sampled an analog signal or that up/down converted an already sampled signal to provide data samples. A bus interface width may correspond to a width of an interconnect operatively coupling a buffer interface to a memory with frame buffers (e.g., operatively coupling buffer interface 120 to memory 152 of FIG. 1C). For example, 12-bit data samples corresponding to a 12-bit output of an ADC of a source of data samples may be adapted to a 16-bit word width of a bus interface. By way of example, packers 214, 236, and 248 may each be a set of registers configured as a line buffer or a crossbar of wires which hold data samples until overwritten.

Among other advantages, packing data samples minimizes a number of data moves from an input line buffer to a frame buffer given a particular sample width and a particular bus interface width. Minimizing a number of data moves to fill a frame buffer optimizes bus throughput and power consumption as compared to performing more data moves to fill a frame buffer. Moreover, packing in conjunction with frame buffers that facilitate fewer numbers of fired processor interrupts, optimizes bus performance as well as a processor's performance of its core functions as compared to a data transport scheme that does not use frame buffers and/or minimize a number of data moves to frame buffers. In another embodiment, the packer can combine only certain configured number of samples into a packet and then initiate a data move. This flexibility of controlling how many samples can be packed into one packet, and/or at what rate the samples can arrive into the Uplink channel handler manifests as a key flexibility criteria when implementing complex audio processing functions in the processor.

In one or more embodiments, uplink controllers 204, 228, and 240 may be configured to retrieve configuration parameters from configuration registers 206, 230, and 242, respectively. Generally, configuration registers 206, 230, and 242 may be configured to store configuration parameters for each of channel 0, 1 and N, respectively. By way of example, configuration parameters may include one or more of parameters related to a processing frame expected by a processing algorithm (i.e., processing frame parameters), and parameters related to sampling (i.e., data sampling parameters) used to generate data samples received at uplink channel handlers 202, 226, and 238.

By way of a contemplated operation of uplink channel handler 202 that is generally applicable to operation of uplink channel handlers 226 and 238, as data samples 224 arrive at FIFO 212, packer 214 packs data samples 224 according to a first bus interface width to optimize a number of samples of data samples 224 moved from line buffer 210 to a first input frame buffer in a single move transaction, which move may include, without limitation, a burst of memory transactions or a single memory transaction to move contents of input line buffer 210. Uplink controller 204 may provide a data move request 220 responsive to receiving, from line buffer 210, a data ready message 218 indicating that data samples packets 222 are ready to be move. By way of example, data move request 220 may include memory addresses for locations in memory of a first input frame buffer or a channel identifier for channel 0 usable (e.g., by memory DMA 132 of FIG. 1C) to resolve memory addresses for locations in memory associated with a first input frame buffer.

In one or more embodiments, line buffers 210, 232 and 244 are configured to notify (e.g., data ready 218) uplink controllers 204, 228, and 240 that data sample packets are ready/available to send to applicable input frame buffers. In one embodiment, uplink controllers 204, 228, and 240 may be configured to count, for channel 0, 1 and N, a total number of data samples sent from input line buffers 210, 232, and 244, respectively to input frame buffers, and notify a processing system (e.g., processing system 150) when a count indicates that an input frame buffer for a channel is full (or near full).

In one embodiment, configuration registers 206, 230, and 242 store frame buffer sizes and uplink controllers 204, 228, and 240 receive such frame buffer sizes (e.g., in terms of a number of samples to fill an input frame buffer or a processing frame), for example, as configuration parameters 216.

By way of a contemplated operation of uplink controller 204 that is generally applicable to operation of uplink controller 228 and 240, uplink controller 204 determines a number of data samples 224 in each data packet of data samples packets 222 and each time a data packet of data samples packets 222 is provided by input line buffer 210 then uplink controller 204 increments a sample count by a number of data samples 224 stored in a data packet of data samples packets 222. Uplink controller 204 detects when an input frame buffer is full responsive to the sample count. For example, if a sample count indicates that a frame buffer is full or that there would be a data overrun at an input frame buffer if more samples were stored at the input frame buffer, then uplink controller 204 sends a notification (e.g., an interrupt) to an applicable processing system.

In one or more embodiments, FIFOs 212, 234, and 246 (and line buffers 210, 232, and 244 more generally) may include enough spare storage to receive additional data samples without a data overrun, for example, while data samples are stored at input frame buffers and/or while waiting for contents of input frame buffers to be processed.

While the example embodiments shown and described with reference to FIG. 2A show one line buffer for uplink channel handler, the disclosure is not so limited. Indeed, it is specifically contemplated that an uplink channel handler (and a downlink channel handler) may implement multiple line buffers. For example, an uplink channel handler may include two input line buffers and operate them in an alternating fashion in order to relax interface speeds. For example, to relax constraints related to ensuring transport of data samples (and processed data samples) to and from frame buffers without data overflow at a line buffer.

Figure 2B:
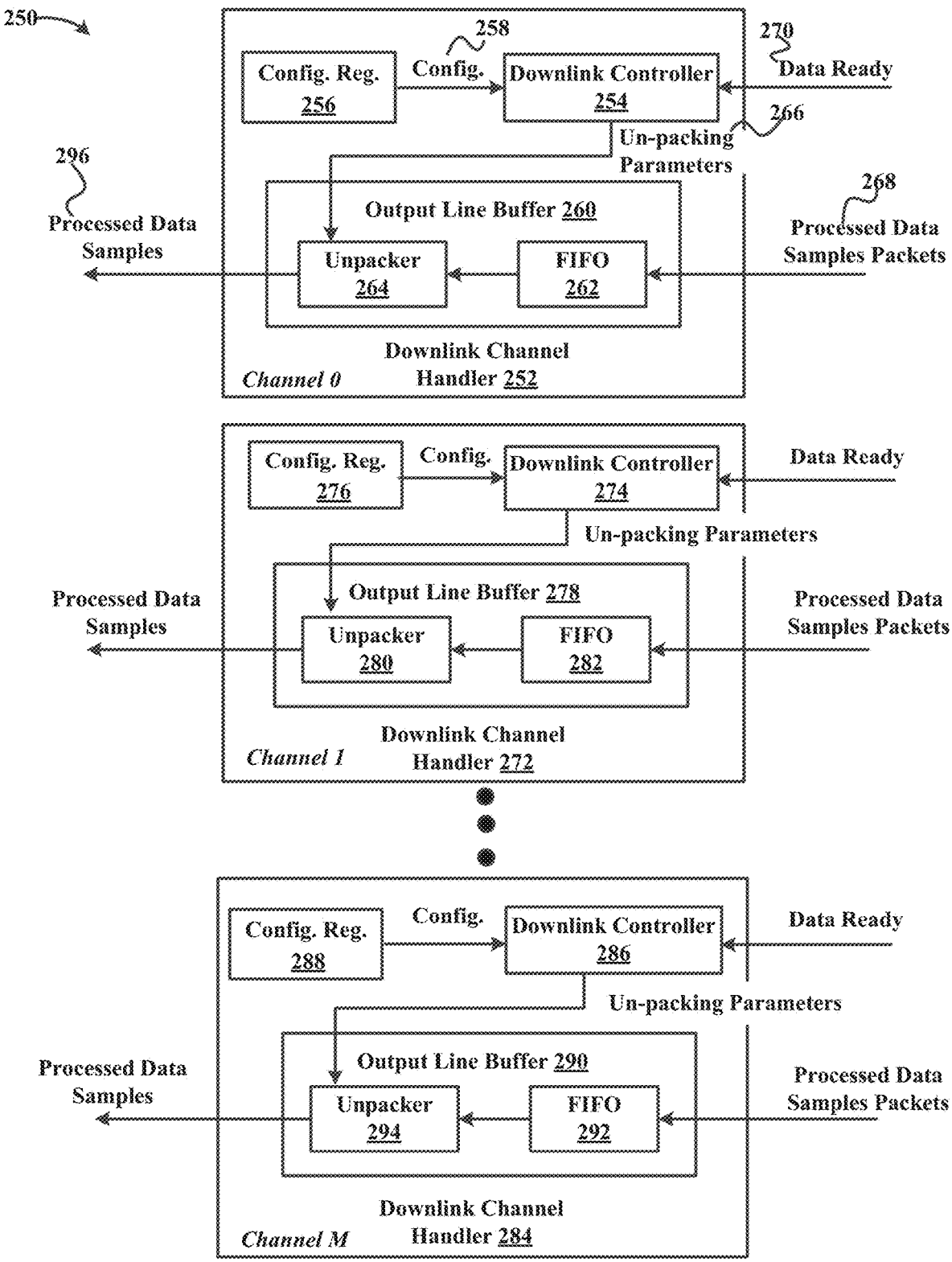
FIG. 2B is a functional block-diagram of a system of downlink handlers, in accordance with one or more embodiments of the disclosure.

FIG. 2B is a functional block-diagram of a system 250 of downlink channel handlers 252, 272, and 284, in accordance with one or more embodiments of the disclosure. Downlink channel handlers 252, 272, and 284 may be configured, generally, to configure constituent output line buffers 260, 278, and 290, monitor states of output frame buffers (e.g., vacant, full, accessible, inaccessible, etc.), receive notification that contents of output frame buffers (e.g., processed data samples) are ready to be moved, and notify a processing system that contents of output frame buffers (e.g., processed sampled date) has been moved from output frame buffers.

In an example embodiment shown in FIG. 2A, system 250 includes M downlink channel handlers, and more specifically, includes downlink channel handler 252, 272, and 284. Downlink channel handler 252 includes downlink controller 254, configuration register 256, and output line buffer 260. Downlink channel handler 272 includes downlink controller 274, configuration register 276, and output line buffer 278. Downlink channel handler 284 includes downlink channel controller 286, configuration register 288, and output line buffer 290. Each downlink channel handler 252, 272, and 284 is configured to receive processed data samples from output frame buffers (e.g., of frame buffers 154 of FIG. 1C). In one or more embodiments, each downlink channel handler 252, 272, and 284 may be associated with an output channel (e.g., to data sinks 50 of FIG. 1A).

In one or more embodiments, output line buffers 260, 278, and 290 may be configured, generally, to match bandwidths of output channels (i.e., channels between output line buffers and data sinks) to bandwidths of output frame buffer channels (i.e., channels for moving processed data samples from output frame buffers), as well as adapt sizes of processed data samples arriving on output frame buffer channels to expected sizes (e.g., such as a bus interface size for an output channel) for output channels to data sinks. In one or more embodiments, output line buffers may include a line buffer for each of M output channels handled by downlink channel handler 252.

In the example embodiment shown in FIG. 2B, each downlink channel handler 252, 272, and 284 is configured to handle one output channel, in other words, there is a one-to-one correspondence of a number of downlink channel handlers and a number of output channels (here, M). However, like uplink channel handlers, this is not a requirement and a downlink channel handler may be configured to handle more than one output channel, up to and including one downlink channel handler managing up to all output channels of a data transport system using stored configuration parameters for each output channel.

In an embodiment shown in FIG. 2B, M output line buffers are associated with M output channels, including output line buffer 260, output line buffer 278, and output line buffer 290, which are associated with output channel 0, output channel 1, and output channel M, respectively.

Each output line buffer 260, 278, and 290 may be configured, generally, to receive, store, and modify processed data samples. In one or more embodiments, output line buffers 260, 278, and 290 may include FIFO buffers 262, 282, and 292, respectively, and unpackers 264, 280, and 294, respectively.

Unpackers 264, 280, and 294 may be configured, generally, to perform substantially in a similar manner described for packers 214, 236, 248 of FIG. 2A, but instead pack processed data samples responsive to unpacking parameters (e.g., unpacking parameters 266) received from downlink channel controllers 252, 272 and 284 or as configured to by downlink channel controllers 252, 272 and 284. Unpacking parameters may include, for example, at least output sample widths and bus interface widths. In one or more embodiments, output sample widths are widths expected by a data sink. In one embodiment, processed data samples may already be at an output sample width, for example, because a processor is configured to provide processed sample data at a width equal to the output sample width. However, this is not a requirement and processed data samples may arrive at a width different than a sample output width, and are modified. In one or more embodiments, a bus interface width is a width of a bus from memory to a downlink channel handler.

In a contemplated operation of downlink channel handler 252 that is generally applicable to operation of downlink channel handlers 272, and 284, as processed data samples packets 268 are received at FIFO 262 from output frame buffers, unpacker 264 de-packetizes received processed data samples packets 268 into frames of processed samples at a output sample width, and outputs them as processed data samples 296.

In one or more embodiments, downlink channel controllers 254, 274, and 286 may be configured to retrieve configuration parameters from configuration registers 256, 276, and 288, respectively. Generally, configuration registers 256, 276, and 288 may be configured to store configuration parameters for each output channel 0 to M. In an example embodiment shown in FIG. 2B, configuration registers 256, 276, and 288 are associated with output channel 0, 1, and M, respectively. Configuration parameters used by downlink channel handlers may include processing frame parameters (e.g., a processing frame duration) and data sampling parameters (e.g., a sampling rate). FIG. 2B illustrates configuration parameters 258 provided to downlink controller 254.

By way of a contemplated operation of downlink channel handler 252 in conjunction with processing system 150 (FIG. 1C) that is generally applicable to operation of downlink channel handlers 272 and 284, assume that processor 156 has processed data samples and such processed data samples are stored in one or more output frame buffers of frame buffers 154. Responsive to a processed data ready notification 270 received from processor 156, downlink controller 254 receives one or more processed data sample packets 268 of processed data samples stored at output frame buffers. In one embodiment, downlink controller 254 may be configured to check a flag bit associated with an output frame buffer that is indicative of valid data being available in the output frame buffer. Processor 156 sets this "valid data" bit when it has moved processed data samples into an output frame buffer. If downlink controller 254 checks that valid data bit and it is not set, then the downlink controller 254 may give out a "no valid data available" interrupt to the processor 156 to notify the processor 156 that it is ready for more valid data. The downlink controller 254 continues to check the valid data bit and give out the interrupt until the valid data bit is set. In this manner, processor 156 may be notified when a downlink channel handler 252 is moving processed data samples from an output frame buffer.

In one embodiment, downlink controller 254 may send a data move request (e.g., to DMA 132) to access and initiate moving processed data samples to output line buffer 260.

As processed data samples packets 268 are received at line buffers 260, downlink controller 254 monitors a number of received data samples and detects when all contents of a particular output frame buffer have been moved. By way of example, downlink controller 254 may increment a processed sample count for processed data samples received in processed data samples packets 268, and when the processed sample count is indicative of all contents being moved, notify processor 156 that, for a particular output frame buffer, all processed data samples have been moved.

In one or more embodiments, data sinks may be any recipient of processed data samples 296, and may be operatively coupled to input line buffers, and buffer interfaces 120 more generally, by downlink channels. By way of example, a data sink may be a processing system, a speaker, a transmitter, a memory, a data path interface (e.g., integrated inter-IC sound bus ($I^2S$)), universal asynchronous receiver/transmitter (UART), pulse-code modulated to pulse-density modulated bit stream converter (PCM2PDM), $I^2C$ (inter-integrated circuit), or a data path (e.g., CODEC data path, digital-to-analog converter data path, memory storage data path, wireless transmission data path, without limitation).

It is specifically contemplated that in one embodiment one or more buffer interfaces may facilitate uplink and downlink, and in another embodiment one or more buffer interfaces may facilitate uplink or downlink, but not both. For example, and with reference to FIG. 1A, separate buffer interfaces may be used for uplink and downlink, or a system may include a buffer interface to facilitate moving processed data from frame buffers 154 to a data sink 50, or include a buffer interface to facilitate moving data samples from a source 10 to frame buffers 154, but not both.

In one of the embodiments, the Downlink Channel Handler 252, could generate an interrupt to the processor if the handler is about to initiate a Data Receive transfer, but there is no valid data available in the Downlink Frame Buffer. This is typically referred to as Data Underflow.

For conciseness, the following descriptions of handling samples from one or multiple sources, setting up frame buffers, defining frame buffers in pairs and as linked lists are presented for an uplink channel. Those of ordinary skill will recognize that the descriptions also apply (with minor recognizable changes related to direction of data flow) for downlink channels.

In one embodiment, it is specifically contemplated that data samples 136 may be provided from multiple sources operatively coupled to a system or sub-system that includes buffer interfaces of this disclosure, for example, units monitoring multiple batteries, an analog microphone, a digital microphone, an external codec, a communication module (e.g., for ETHERNET®, BLUETOOTH®, WI-FI, without limitation), and the like. The data samples sources 10 may be operatively coupled to, for example, one or more input/output pins of an embedded system that includes the buffer interface.

Figure 3A:
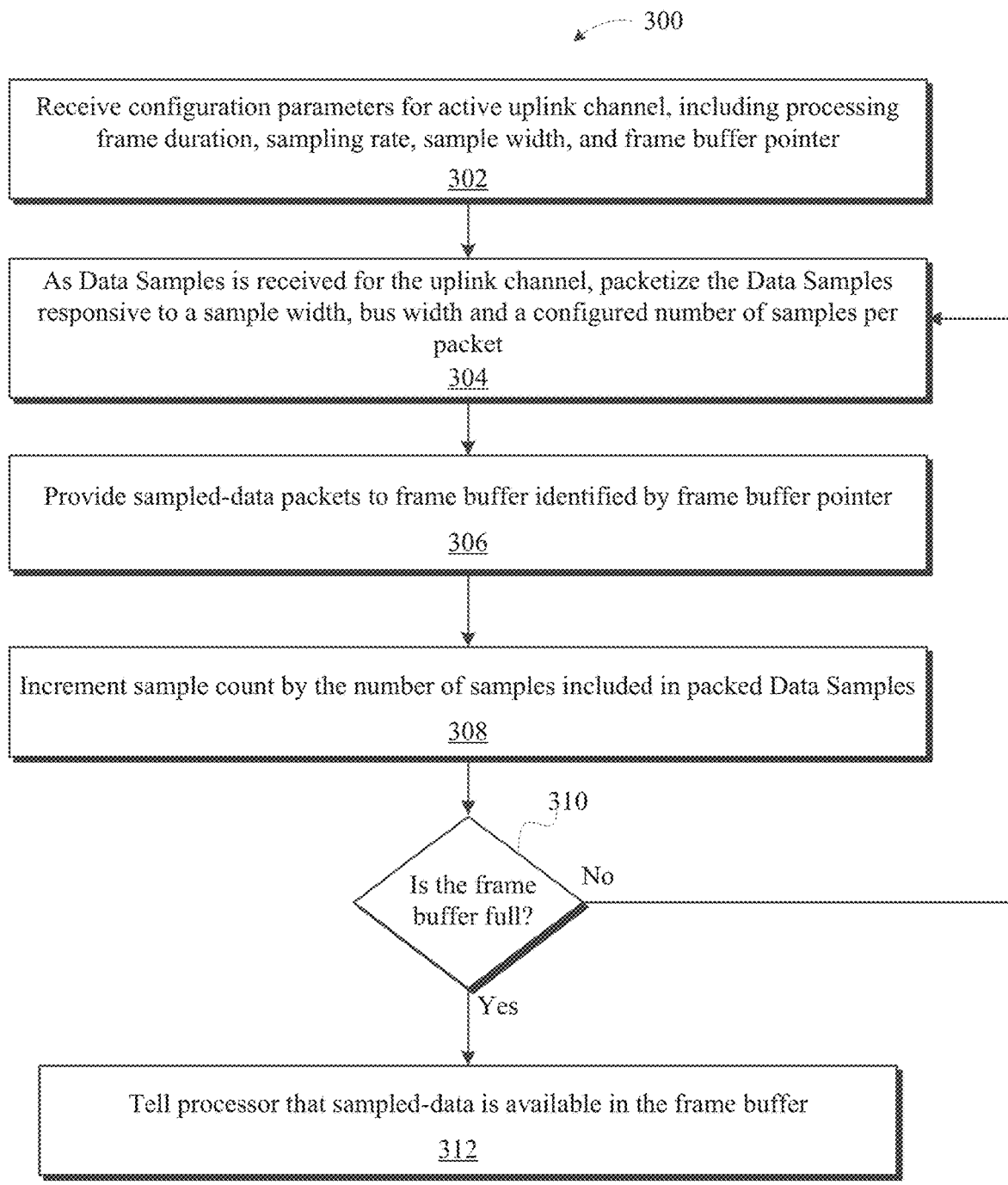
FIG. 3A shows a flowchart of an uplink channel handling process for data samples that is received from different sources, in accordance with one or more embodiments of the disclosure.

FIG. 3A shows a flowchart of an uplink channel handling process 300 for data samples that is received from different sources. In operation 302, configuration parameters for an active uplink channel are received. In one embodiment, the configuration parameters may include a processing frame duration, sampling rate, a sample width, and a frame buffer pointer. In operation 304, as data samples is received for the active uplink channel, the data samples is packetized responsive to a sample width, a bus interface width, and a configured number of samples per packet. In operation 306, data samples packets are provided to a frame buffer identified by the frame buffer pointer, which is associated with the uplink channel. In operation 308, a sample count associated with the frame buffer is incremented by the number of samples included in the data samples packets. In operation, 310, it is determined, based, at least in part, on the incremented sample count and frame buffer size, if the frame buffer is full—i.e., the incremented sample count indicates that the frame buffer has reached a maximum number of samples such that if another packet of samples is provided it would saturate the frame buffer. If the frame buffer is full (in other words, a processor has a processing frame worth of data samples required by a processing algorithm), then in operation 312 processor 156 is notified that data samples is available in the frame buffer 154 (e.g., using an interrupt, setting a flag, or the like) and the current movement of a processing frame worth of data samples is complete. If the frame buffer is not full, then process 300 loops back to operation 304, and continues to receive data samples.

Figure 3B:
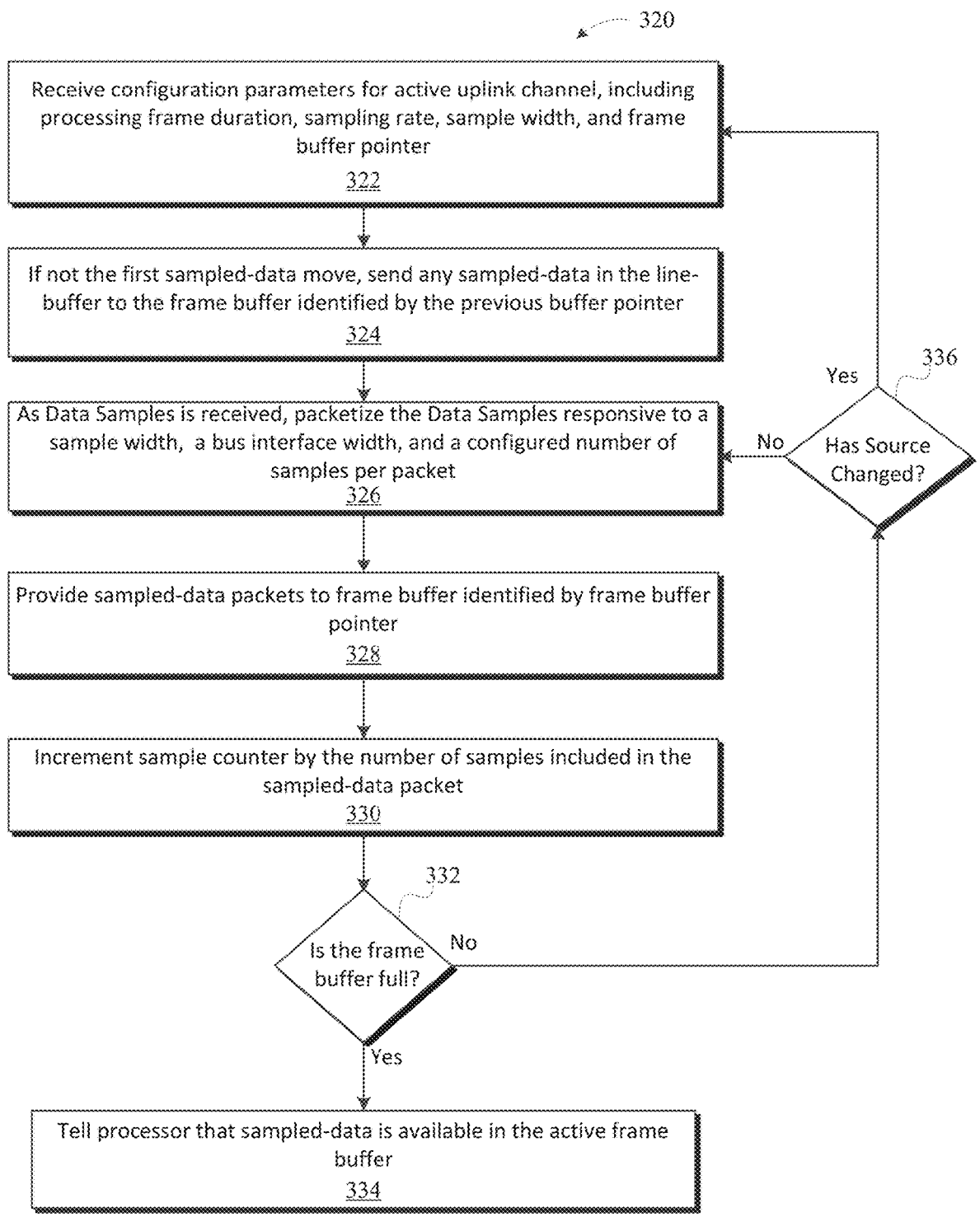
FIG. 3B shows a flowchart of an uplink channel handling process for groups of data samples that are stored in a common memory, in accordance with one or more embodiments of the disclosure.

FIG. 3B shows a flowchart of an example uplink channel handling process 320 for groups of data samples where the data sample processor keeps track of an active data sample source, i.e., the data samples are not received on separate channels. In this example, an uplink handler cannot easily discriminate among types of data samples and apply the right packing scheme as well as monitor whether framebuffers are full and so relies, at least in part, on externally provided information. In operation 322, configuration parameters for an active uplink channel are received. In this embodiment, an active uplink channel means an uplink channel associated with received data samples. In one embodiment, the configuration parameters may include a processing frame duration, sampling rate, sample width, and frame buffer pointer. If the current operation is the first move of data samples, then a line buffer should be empty or can be written over, but if it is not the first move, then there may be sampled-data that should be sent to a frame buffer pointed to by a previous frame buffer pointer. So, in operation 324, a determination is made if this is the first move, and if not the first move, any data samples in the line buffer are provided to the frame buffer identified by the previous frame buffer pointer. In operation 326, as data samples are received, the data samples are packetized responsive to the sample width, a bus interface width, and a configured number of samples per packet. In operation 328, data samples packets are provided to the frame buffer identified by the frame buffer pointer. In operation 330, a sample count is incremented by the number of samples included in a data samples packet. In operation 332, a determination is made whether an active frame buffer is full based, at least in part, on the sample count, sample size, and size of the frame buffer. If it is determined that the frame buffer is full, in operation 334, the processor is notified that data samples are available in the frame buffer and the current movement of a processing frame worth of data samples is complete. The processor then checks to see if data samples are available from the same or a different data samples source that is assigned to the active uplink channel. If available from different data samples source then the processor reassigns the active uplink channel to one of the other data samples sources for which data samples are available. If available from the same data samples source then the processor does not have to re-assign the active uplink channel to another data samples source, though it may still do so for resource management reasons. If, in operation 336, the assigned data sample source has changed, then process 300 loops back to operation 322, and new configuration parameters for the assigned data sample source are used to configure the active uplink channel. Assignment may include, without limitation, configuring an active uplink channel with configuration parameter for the assigned data sample source. If no change, then the process 300 loops back to operation 326 and continues to receive data samples from the assigned data sample source.

Figure 3C:
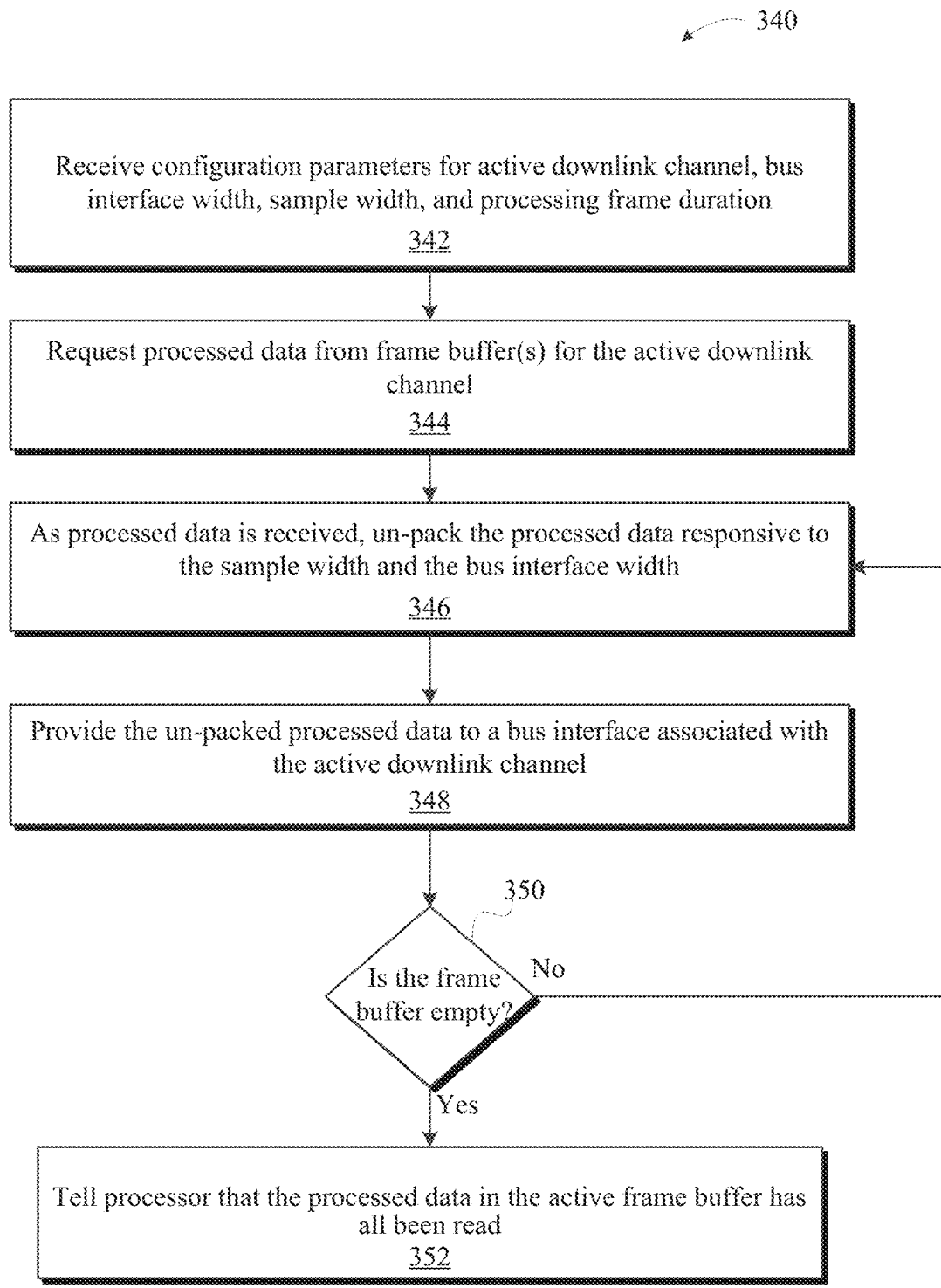
FIG. 3C shows a flowchart of a downlink channel handling process for processed data samples that are stored in frame buffers.

FIG. 3C shows a flowchart of an example downlink channel handling process 340 for processed data samples that are stored in frame buffers. In operation 342, configuration parameters are received for an active downlink channel. An active downlink channel is the channel from frame buffer to downlink handler and the channel from downlink handler to data sink.

In one embodiment, configuration parameters may include a bus interface width, a sample width, and a processing frame duration. In operation 344, processed data is requested from the frame buffer associated with the active channel. In one embodiment, a request may include checking if a buffer includes valid data. For example, a buffer validity bit may be set to indicate valid data (i.e., processed data samples) is available in a frame buffer, e.g., "0" for no valid data and "1" for valid data. Moreover, an interrupt may be given to a processing system if a result of a valid data check is "0" or no valid data. Such an interrupt may indicate to a processing system, among other things, that valid data is expected but not available or that a frame buffer is available for data samples.

In operation 346, as processed data samples are received the processed data samples are unpacked to the sample width and bus interface width for the active channel. In operation 348, the un-packed data samples are provided to a bus interface associated with an output channel to a data sink. In operation 350, a determination is made whether all of the contents of a frame buffer have been moved (which may also be referred to herein as a frame buffer being "empty"). In one embodiment, processed data samples are counted as they are outputted and all of the contents of an output frame buffer are determined to have been moved when a processing fruition duration worth of processed data samples have been counted. If the determination is that contents of the frame buffer has all been moved, then in operation 352 the processing system is notified that all of the contents of the frame buffer have been read and process 340 ends. If the determination is that the frame buffer is not empty, then process 340 loops back to operation 344, makes another packet read request from the frame buffer and continues to receive processed data. In one or more embodiments, once process 340 ends a notification may be sent to a processing system and various book-keeping tasks may be performed including, for example, updating downlink parameters such as an address for a next output frame buffer having valid data.

As noted above, in one or more embodiments, data samples packets are received in memory 152 at frame buffers 154. Each frame buffer 154 may be associated with a processing frame duration, which is a time window of collected samples used by a processing algorithm. Since sampling rates at each uplink channel may be different, it would be inefficient for the processor 156 to read/process each sample at its original sampling rate. So, one or more embodiments of the disclosure relate, generally, to determining processing frame durations and associating the processing frame durations with frame buffers. Thus, an amount of memory associated with each frame buffer 154 is a function of the original sampling rate and bit width. One example advantage of determining and associating a processing frame duration with a frame buffer is that the processing frame duration can be configured per use case/end application or per an algorithm requirement.

Moreover, as more fully described herein, frame buffers enable a processor to use processing cores to work on core signal processing functions.

Figures 4A, 4B:
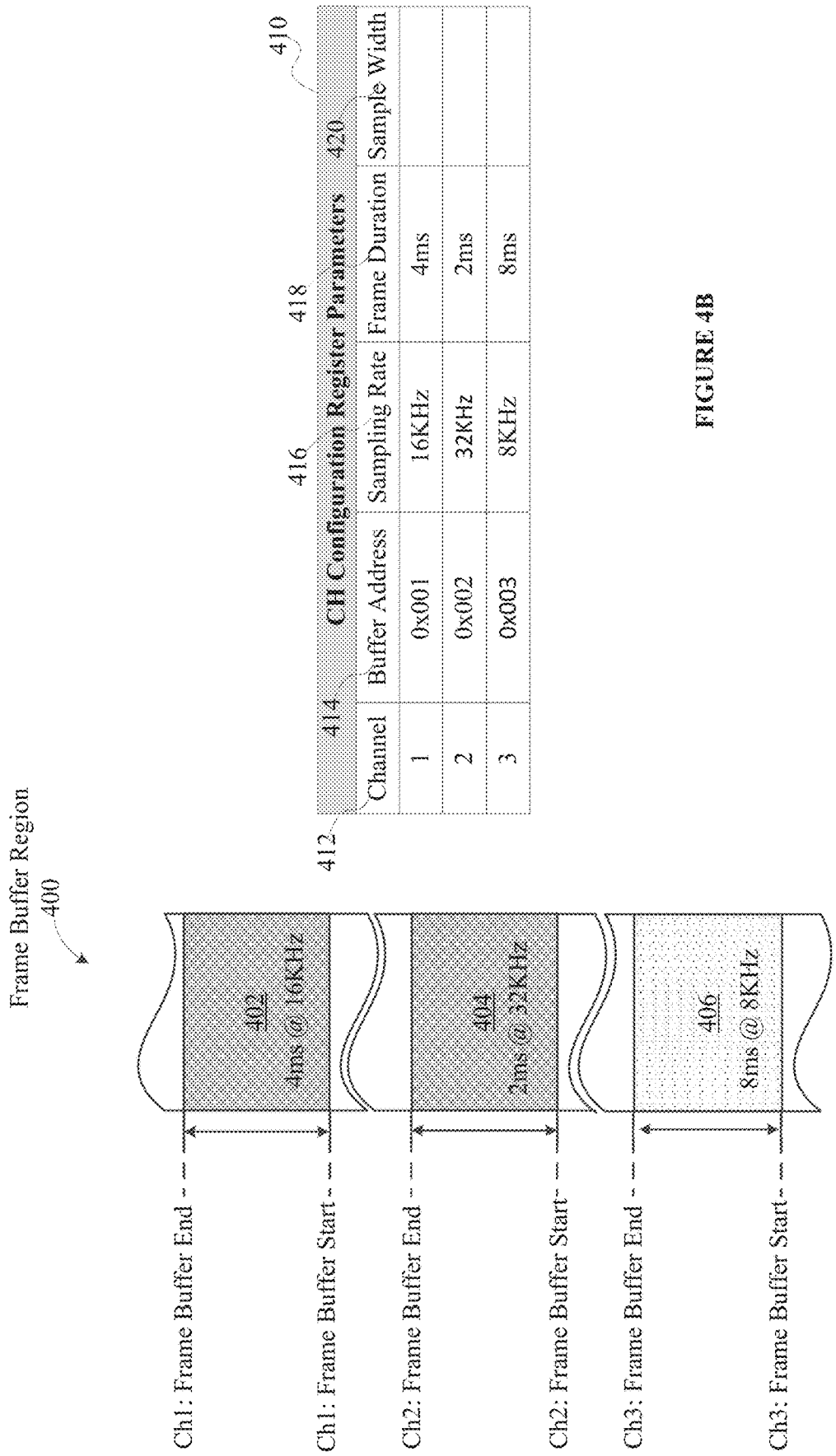
FIG. 4A shows an example memory map of frame buffer region in a memory, in accordance with one or more embodiments of the disclosure.
FIG. 4B shows a table of uplink channel configuration parameters that may be determined and stored in channel configuration registers, and then used for moving data samples, in accordance with one or more embodiments of the disclosure.

FIG. 4A shows an example memory map of frame buffer region 400 in a memory, in accordance with one or more embodiments of the disclosure. Three example frame buffers configured to store data samples are shown, and each example frame buffer is associated with a different uplink channel of a buffer interface 120. Frame buffer 402 is associated with channel 1, frame buffer 404 is associated with channel 2, and frame buffer 406 is associated with channel 3. Each frame buffer 402, 404, and 406 is defined by a starting address and ending address in a memory.

Each frame buffer 402, 404, and 406 is associated with a processing frame duration. In one embodiment, the processing frame duration corresponds to a time window during which samples are collected at a data samples source. The duration may be based, at least in part, on a number of desired samples and a sampling rate of the data samples source. By way of example, the number of desired samples may be specified by a processing algorithm implemented at a processor. In the example shown in FIG. 4A, an example processing algorithm requires 64 samples and the sampling rates of the data samples sources for channels 1-3 are 16 KHz, 32 KHz, and 64 KHz, respectively. So, the processing frame durations for channels 1, 2, and 3 are 4 milliseconds, 2 milliseconds, and 8 milliseconds, respectively in order to capture the desired number of samples.

In one or more embodiments, frame buffer locations, processing frame durations, and sampling rates may be associated with each channel during setup. FIG. 4B shows an example table 410 of uplink channel configuration parameters that may be determined and stored in channel configuration registers, and then used for moving data samples. Each channel 412 is associated with addresses 414 (or pointer addresses) of a frame buffer (e.g., frame buffer 402, 404, and 406 of FIG. 4A) allocated in memory, a sampling rate 416, a processing frame duration 418 (which, for example, may be defined in terms of time or a number of samples), and a sample bit width 420.

Figure 5:
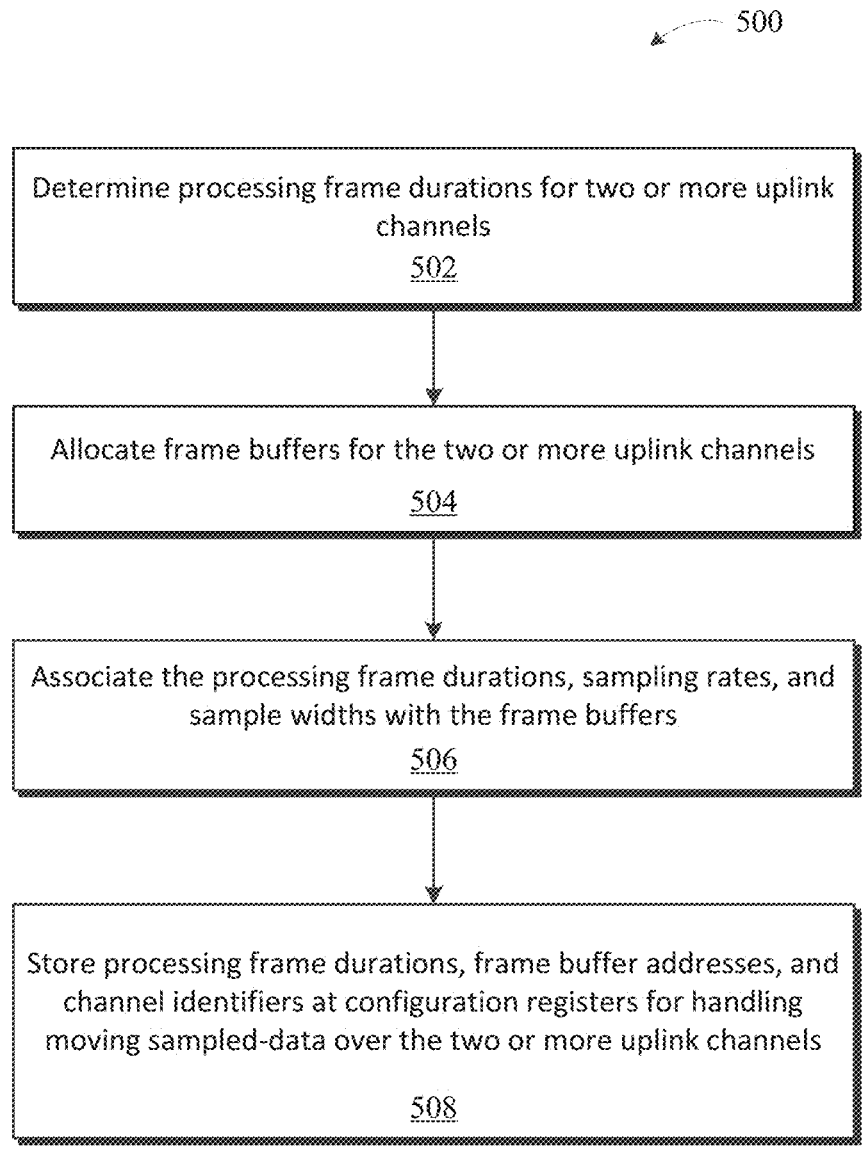
FIG. 5 shows a flow-chart of set-up process for allocating frame buffers in memory and initializing configuration registers for a buffer interface to handle movement of data samples for uplink and movement of processed data samples for downlink, in accordance with one or more embodiments of the disclosure.

FIG. 5 shows a flow-chart of set-up process 500 for allocating frame buffers in memory and initializing configuration registers for a buffer interface to handle movement of data samples for uplink and movement of processed data samples for downlink, in accordance with one or more embodiments of the disclosure. In operation 502, processing frame durations are determined for two or more uplink channels. In one embodiment, a processing frame duration is an ideal processing frame duration calculated by dividing a number of desired sampled by a sampling rate—e.g., (64 samples)±(8000 samples/second)=8 millisecond processing frame duration. In another embodiment, a processing frame duration is selected from a set of available processing frame durations by calculating the ideal processing frame duration, and then selecting an available processing frame duration that will result in at least the desired number of samples. For example, if the desired number of samples is 128, the sampling rate is 96 KHz, and the available processing frame durations are 1 or 2 milliseconds, then a processing frame duration of 2 milliseconds is selected because 192 samples received in 2 milliseconds >128 samples required, whereas only 96 samples are received in 1 millisecond. In one or more embodiments, the available frame durations may be based, at least in part, on the type of data samples and end user application for which it was sampled (e.g., audio, video, power monitoring, without limitation).

In operation 504, frame buffers 154 are respectively allocated for the two or more uplink channels. Each frame buffer 154 is a logical region in memory 152 that is defined between a starting address and an ending address. In one or more embodiments, the size (e.g., in bits) of a frame buffer may be based, at least in part, on the number and bit width of the desired samples. In operation 506, the processing frame durations, sampling rates, and sample bit widths are associated with each of the frame buffers. In operation 508, processing frame durations, frame buffer addresses, sampling rates, and sample widths for each channel are stored in configuration registers 206 for handling moving data samples over the two or more uplink channels.

In some cases, data samples processors such as processor 156 of FIG. 1C are configurable to read and process data from different memory locations for the same uplink channel. So, one or more embodiments relate, generally, to allocating pairs of frame buffers to each channel. From the perspective of the bus interface, when one of the frame buffers 154 of the pair is full of samples, then the other frame buffer may be written to so that the first frame buffer full of samples to be processed is available to the processor 156. Similarly, for a downlink channel, one of the frame buffers may be used for data processing by the processor 156 while the other frame buffer 154 is used for data movement to the downlink line buffer.

Notably, pairs of line buffers, input line buffers in a case of uplink, and output line buffers in case of downlink, may be implemented and used with pairs of frame buffers. For example, an uplink channel handler may be include a first input line buffer configured to send data to a first input frame buffer, and may include a second input line buffer configured to send data to a second input line buffer; and the first input line buffer and the second input line buffer may form a frame buffer pair. Similarly, a downlink channel handler may be include a first output line buffer configured to receive data from a first output frame buffer, and may include a second output line buffer configured to receive data from a second output line buffer; and the first output line buffer and the second output line buffer may form a frame buffer pair.

Figure 6:
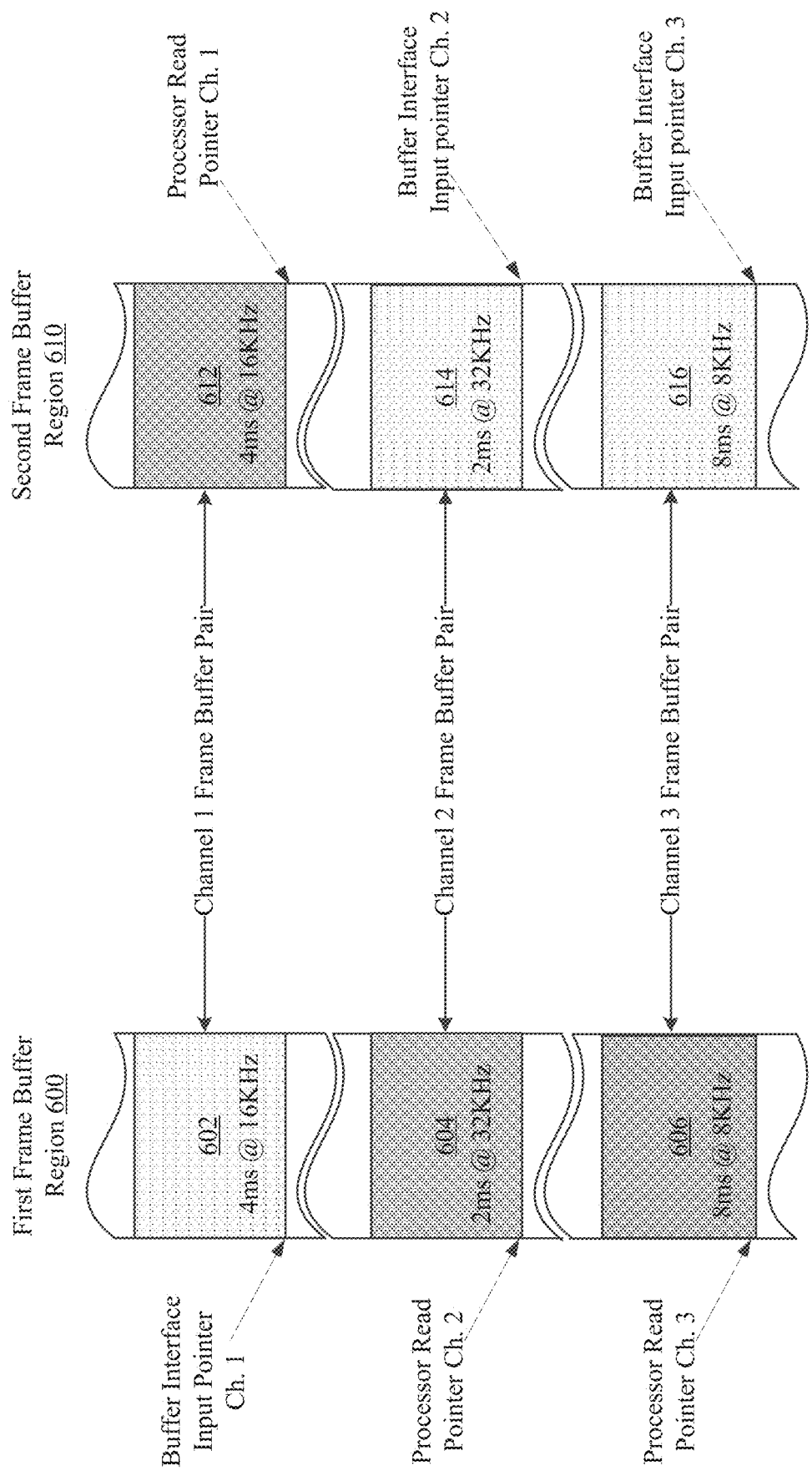
FIG. 6 shows an example memory map of a first frame buffer region and second frame buffer region in a memory.

FIG. 6 shows an example memory map of a first frame buffer region 600 and second frame buffer region 610 in a memory. In one or more embodiments, the frame buffers in first frame buffer region 600 form frame buffer pairs with the frame buffers in second frame buffer region 610. So, each uplink channel has an associated frame buffer pair defined in first frame buffer region 600 and second frame buffer region 610 in memory. Namely, frame buffer pair 602, 612 for channel 1, frame buffer pair 604, 614 for channel 2, and frame buffer pair 606, 616 for channel 3.

So, in one example of a contemplated data movement relating to channel 1, an input pointer for the buffer interface 120 points to frame buffer repair 602 while the read pointer for the processor 156 points to frame buffer repair 612. As shown in FIG. 6, similar alternating operations are performed for channel 2 and channel 3.

Similarly, for a contemplated data movement involving pairs of output frame buffers, a buffer interface output pointer may point to a first output frame buffer of an output frame buffer pair, where the first output frame buffer has processed data samples to move. A processor write pointer may point to a second output frame buffer of the output frame buffer pair where processed data samples are to be written or are being written. Moreover, the buffer interface output pointer may also be configured to point to the second output frame buffer to move processed data samples stored there, and the processor write pointer may be configured to point to the first output frame buffer and move processed data samples there.

Figure 7:
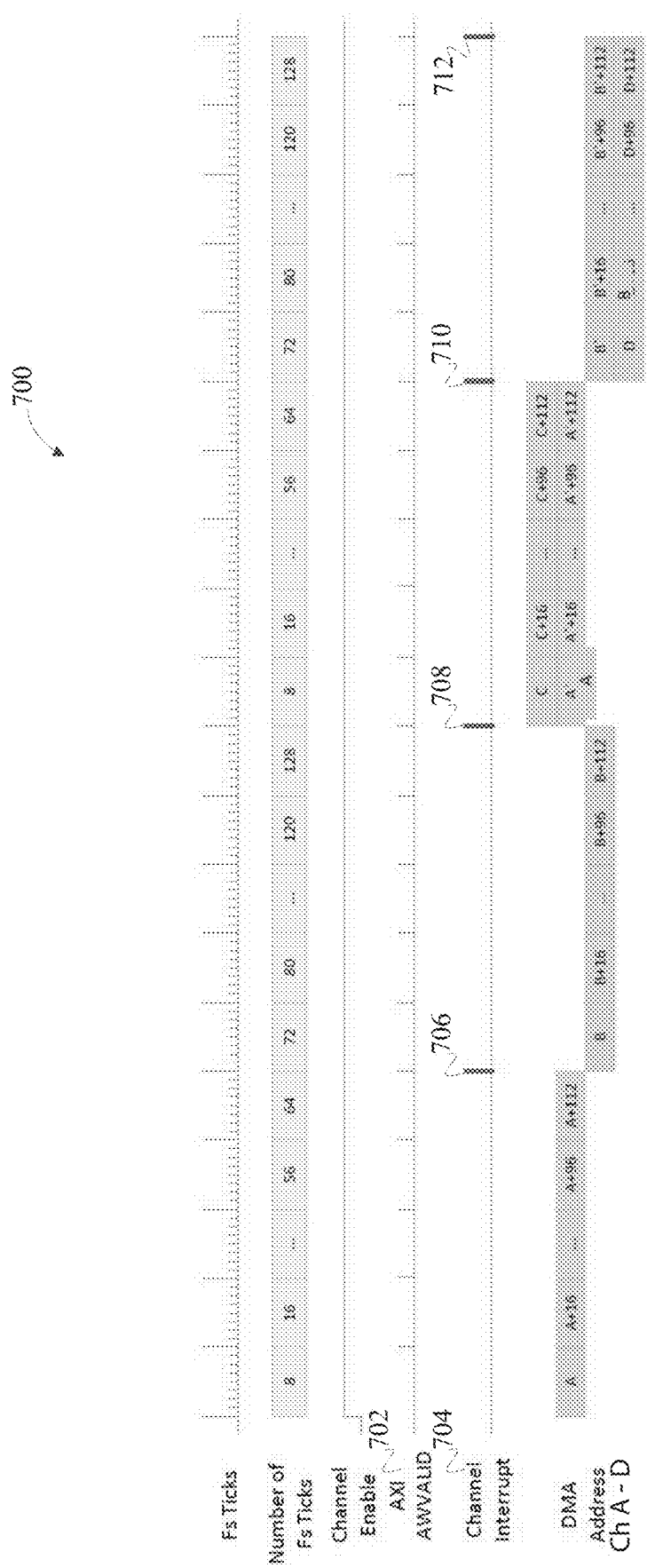
FIG. 7 shows a timing diagram of an example data move during uplink where frame buffer pairs are used, in accordance with one or more embodiments of the disclosure.

FIG. 7 shows a timing diagram 700 of an example data move during uplink where a link list of frame buffer are used for a channel, in accordance with one or more embodiments of the disclosure. In the embodiment shown in FIG. 7, the unit of time is samples (since samples are received in mostly consistent time intervals). Shown in FIG. 7 are clock edges 702 for valid data on an interconnect coupling a memory having frame buffers defined there in to a buffer interface (e.g., interconnect 114 coupling memory 104 to buffer interface 108 of FIG. 1B), labelled AXI AWVALID; channel interrupt 704; and frame buffer contents for frame buffer pairs associated with two channels. In the example shown in FIGS. 7, A and B are frame buffer pairs for channel A, and C and D are a new frame buffer pair for channel A, as explained below.

In the example shown in FIG. 7, interrupt 706 is fired responsive to frame buffer A being full, and so data samples for channel A are moved to frame buffer B. Interrupt 708 is fired responsive to frame buffer B being full. Frame buffer A is still full, so new frame buffer pair C and D is allocated and data samples for channel A are moved to frame buffer C. Interrupt 710 is fired responsive to frame buffer C being full, so data samples are moved to frame buffer D. Interrupt 712 is fired responsive to frame buffer D being full. In one embodiment, frame buffer pair A/B, frame buffer pair C/D, and further frame buffer pairs yet still, may be formed into a linked list as described with reference to FIG. 8.

FIG. 7 is just one example to highlight timing between reads, writes, and interrupts, as well as to illustrate the use of paired frame buffers.

In one or more embodiments, when an uplink handler is configured to operate using frame buffer pairs (e.g., switch to the next assigned buffer after filling one) a processor is responsible to either use received samples or, in one embodiment, build a link list according to a buffer management procedure so data samples are not lost (e.g., overwritten by new samples received from an uplink channel handler).

One or more embodiments of the disclosure relate, generally, to "interruptless" movement of data into memory. Use of the term "interruptless" is not meant to imply that a processor is not performing any operations in connection with movement of data into memory—for example, it is expected that a processor may manage input and output pointers used by uplink and downlink handlers.

Figure 8:
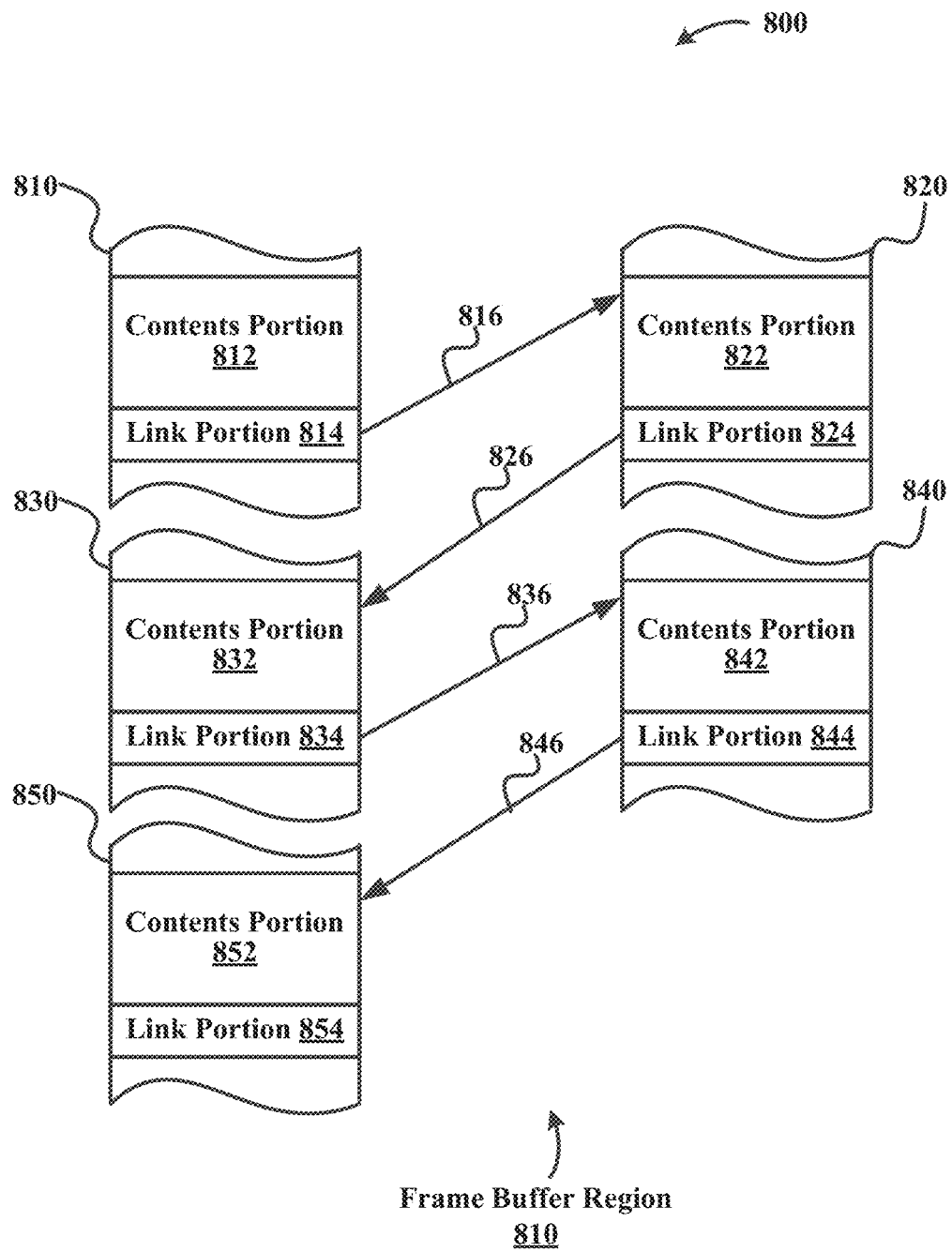
FIG. 8 shows a memory map of a linked-list of frame buffers allocated in a frame buffer region of memory, in accordance with one or more embodiments of the disclosure.

FIG. 8 is a memory map of a frame buffer linked list 800 of frame buffers allocated in a frame buffer region 820 of memory, in accordance with one or more embodiments of the disclosure. In one or more embodiments, frame buffer linked list 800 and its constituent frame buffers (here, frame buffers 810, 820, 830, 840, and 850) are associated with an input channel of a buffer interface. As shown in FIG. 8, frame buffer 10 includes contents portion 812 and a link portion 814. Contents portions 812, 822, 832, 842, and 852 are each configured to store a processing frame of data samples. Link portion 814, 824, 834, 844, and 854 are each configured to store a pointer (here, pointers 816, 826, 836, and 846) for pointing to a location of another frame buffer of frame buffer linked list 800—or in the case of a tail frame buffer, here frame buffer 850, a null pointer or another value indicative of being a tail frame buffer. One of ordinary skill would understand that lists of links could be managed and stored in a different manner than shown in this example, including stored and managed separately by a data sample processor.

In a contemplated frame buffer linked list allocation process of frame buffer linked list 800, a frame buffer controller (not shown, but in one embodiment processor 156 of FIG. 1C) is configured to monitor writes to a frame buffer 810, and when frame buffer 810 has been written (e.g., a complete processing frame has been written to it), the frame buffer controller allocates frame buffer 820 in memory, stores at link portion 814 of frame buffer 810 a pointer 816 to frame buffer 820. The frame buffer controller may also provide an input pointer update to an uplink controller for a channel associated with frame buffer linked list 800. An input pointer update may include information for pointing to an input location at frame buffer 820 so that an uplink controller writes to contents portion 822 of frame buffer 820 and not content portion 812 of frame buffer 810. Frame buffers 830, 840 and 850 may be allocated and used in a similar manner.

So, by implementing a frame buffer linked list 800, a frame buffer for a channel may be continuously allocated, which, among other things, avoids buffer overruns at the buffer interface 120 (i.e., at the line buffers 208) waiting for a frame buffer to be available to be written to. Notably, an uplink handler that writes to a buffer frame linked list may do so without an interrupt or other notification that a frame buffer for a channel is available to be written to.

In a contemplated read operation with reference to processing system 150 of FIG. 1C, when processor 156 finishes reading data samples from a contents portion 812 of frame buffer 810, processor 156 determines if there is a pointer stored at link portion 814 (e.g., reads a flag that was set when frame buffer 820 was allocated). Processor 156 identifies pointer 816 stored in link portion 814, and then reads data samples from contents portion 822 of frame buffer 820 responsive to pointer 816, which is stored in link portion 814 of frame buffer 810.

So, one advantage allocating frame buffer linked list 800 is that processor 156 may read data from frame buffer linked list 800 when processor 156 is ready, or alternatively, may make it available to another device. Moreover, interrupts, polling, or some other notification mechanism does not have to be implemented for buffer interfaces, frame buffers, and data processors in order to notify the processor that data samples is ready for processing.

One or more embodiments relate, generally, to an audio system (or device) that implements an audio transport scheme for moving audio samples from multiple audio channels to and from audio frame buffers for processing by an integrated CODEC executed by a processor (typically a DSP). Details of this audio data transport use are provided as one example of a use for embodiments of the present disclosure. However, embodiments of the present disclosure may be used on a wide variety of systems using data transport.

Figure 9:
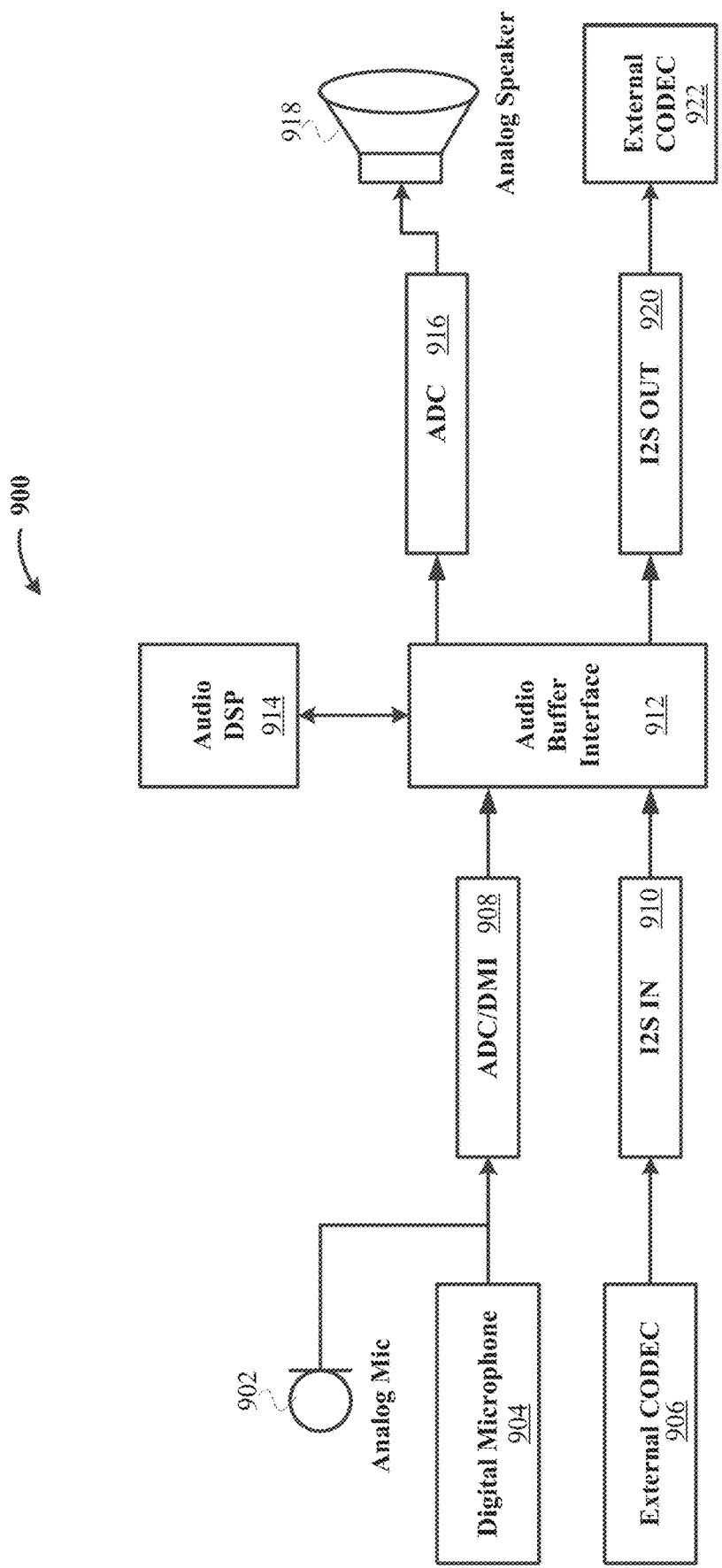
FIG. 9 shows an audio system configured for audio data transport according to one or more embodiments of the disclosure.

FIG. 9 shows an example audio system 900, in accordance with one or more embodiments of the disclosure. Audio system 900 includes several sources of audio samples, including analog microphone 902, digital microphone 904, and external codec 906. These sources are operatively coupled to, and communicate over, a number of data paths, including one or more of an ADC, a data management interface (DMI), and an I²S—here labeled as an uplink channels 908 for ADC/DMI and uplink channel 910 for I²S in. Audio buffer interface 912 receives sampled audio data from uplink channels 908 and 910 and moves the sampled audio data to audio DSP 914 in accordance with one or more embodiments described in this disclosure (i.e., using frame buffers), where audio DSP 914 is an embodiment of processing system 150. The audio samples processed by audio DSP 914 are then moved over data paths, including one or more of DAC/DMI/I²S—here labeled as downlink channel 916 for DAC and downlink channel 920 for I²S out and then to any of a number of destinations, including an analog speaker 918 or an external codec 922. Audio system 900 enables a flexible data transport scheme that is configurable for multiple channels and, thus, is scalable.

It is specifically contemplated that in one or more embodiments, multiple interfaces may be configured to operate at a channel-specific sample rate and/or bit width. In such embodiments, they receive and send samples at non-uniform sample rates and/or bit widths. Frame buffers may be configured to receive samples at the channel specific sample rates and/or bit widths. Processors may be configured to process such samples.

While certain illustrative embodiments have been described in connection with the figures, those of ordinary skill in the art will recognize and appreciate that the scope of this disclosure is not limited to those embodiments explicitly shown and described in this disclosure. Rather, many additions, deletions, and modifications to the embodiments described in this disclosure may be made to produce embodiments within the scope of this disclosure, such as those specifically claimed, including legal equivalents. In addition, features from one disclosed embodiment may be combined with features of another disclosed embodiment while still being within the scope of this disclosure, as contemplated by the inventors.

Additional non-limiting embodiments of the disclosure include:

Embodiment 1: a method of moving data to and from a memory, comprising: determining processing frame parameters and data sampling parameters associated with active communication channels of an embedded system; allocating frame buffer regions of the memory responsive to one or more of the processing frame parameters and the data sampling frame parameters; configuring input line buffers for communication over an interconnect that operatively couples the input line buffers to the frame buffer regions; moving data samples from the configured input line buffers to the allocated frame buffer regions at input locations pointed at by frame buffer input pointers; detecting that a frame buffer of the allocated frame buffer regions is full; and notifying a processing system that the moved data samples are available at the frame buffer responsive to the detecting.

Embodiment 2: the method of Embodiment 1, wherein allocating frame buffer regions of the memory comprises: allocating at least two frame buffers, the at least two frame buffers comprising a first frame buffer and a second frame buffer; associating the at least two frame buffers with respective different communication channels of the active communication channels; and determining and storing the processing frame parameters for the at least two frame buffers.

Embodiment 3: the method of Embodiments 1 and 2, wherein determining and storing the processing frame parameters for the at least two frame buffers comprise: calculating at least two processing frame durations, the at least two processing frame durations comprising a first processing frame duration and a second processing frame duration; allocating a first frame buffer input pointer configured to point to the first frame buffer; allocating a second frame buffer input pointer configured to point to the second frame buffer; storing the first processing frame duration, first frame buffer input pointer, and a first sampling rate; and storing the second processing frame duration, second frame buffer input pointer, and a second sampling rate.

Embodiment 4: the method of Embodiments 1 through 3, wherein calculating at least two processing frame durations comprises calculating the first processing frame duration responsive to a first sampling rate and a target number of samples, and calculating the second processing frame duration responsive to a second sampling rate and the target number of samples.

Embodiment 5: the method of Embodiments 1 through 4, further comprising processing the data samples moved to the frame buffer regions.

Embodiment 6: the method of Embodiments 1 through 5, wherein moving the data samples from the input line buffers to the frame buffer regions at input locations pointed at by the frame buffer input pointers comprises: requesting write access to the input locations at the frame buffer regions; providing the data samples and the input locations to the interconnect that operatively couples the line buffers to the frame buffer regions; and receiving the data samples at the input locations at the frame buffer regions.

Embodiment 7: the method of Embodiments 1 through 6, wherein moving the data samples from the input line buffers to the frame buffer regions at input locations pointed at by the input pointers further comprises: moving data samples from a first line buffer of the input line buffers to a first frame buffer of the allocated frame buffer regions; and moving data samples from a second line buffer of the input line buffers to a second frame buffer of the allocated frame buffer regions.

Embodiment 8: the method of Embodiments 1 through 7, wherein detecting that at least one frame buffer of the frame buffer regions is full comprises: incrementing a sample count responsive to moving data samples from a line buffer of the input line buffers to the at least one frame buffer; and detecting that the sample count is equal to, or greater than, a pre-defined sample count.

Embodiment 9: the method of Embodiments 1 through 8, wherein allocating frame buffer regions of the memory comprises:

Embodiment 10: the method of Embodiments 1 through 9, further comprising, processing contents of one frame buffer of the first pair of frame buffers while moving data from the line buffers to the other frame buffer of the first pair of frame buffers.

Embodiment 11: the method of Embodiments 1 through 10, wherein determining and storing configuration parameters for the at least two pairs of frame buffers comprise: calculating at least two processing frame durations, the at least two processing frame durations comprising a first processing frame duration and a second processing frame duration; allocating a first pair of frame buffer input pointers configured to point to locations at the first pair of frame buffers; allocating a second pair of frame buffer input pointers configured to point to locations at the second pair of frame buffers; associating the first pair of frame buffers with a first pair of line buffers, the first processing frame duration, the first pair of frame buffer input pointers, and a first sampling rate; and associating the second pair of frame buffers with a second pair of line buffers, the second processing frame duration, second pair of frame buffer input pointers, and a second sampling rate.

Embodiment 12: the method of Embodiments 1 through 11, wherein moving data samples from the input line buffers to the frame buffer regions at input locations pointed at by input pointers comprises: moving data samples from the input line buffers to a frame buffer of the first pair of frame buffers at a location pointed at by the first pair of frame buffer input pointers; pointing the first pair of frame buffer input pointers to point to a location at the other frame buffer of the first pair of frame buffers responsive to the frame buffer of the first pair of frame buffers being full; and moving data samples from the input line buffers to the other frame buffer of the first pair frame buffers at the location at the other frame buffer pointed at by the first pair of frame buffer input pointers.

Embodiment 13: the method of Embodiments 1 through 12, wherein calculating at least two processing frame durations comprises: calculating the first processing frame duration responsive to a first sampling rate and a target number of samples, and calculating the second processing frame duration responsive to a second sampling rate and the target number of samples, and wherein the first processing frame duration is for processing samples stored in the first pair of frame buffers, and the second processing frame duration is for processing samples stored in the second pair of frame buffers.

Embodiment 14: the method of Embodiments 1 through 13, wherein the configuring the line buffers for communication over the interconnect that operatively couples the line buffers to the frame buffer regions comprises configuring the line buffers to pack bits of data samples into bit locations of a data frame.

Embodiment 15: the method of Embodiments 1 through 14, further comprising: configuring output line buffers for communication over one or more interconnects operatively coupled to the output line buffers; moving processed data samples at output locations pointed at by output pointers from the frame buffer regions to the output line buffers; and providing the processed data samples to the one or more interconnects.

Embodiment 16: a data samples processing system, comprising: a memory; and a processor comprising one or more processing cores, the processor configured to: allocate at least two frame buffers at the memory, the at least two frame buffers comprising a first frame buffer and a second frame buffer; calculate at least two processing frame durations, the at least two processing frame durations comprising a first processing frame duration and a second processing frame duration; allocate a first frame buffer input pointer configured to point to locations at the first frame buffer; allocate a second frame buffer input pointer configured to point to locations at the second frame buffer; associate the first frame buffer with the first processing frame duration, first frame buffer input pointer, and a first sampling rate; and associate the second frame buffer with the second processing frame duration, second frame buffer input pointer, and a second sampling rate.

Embodiment 17: the system of Embodiment 16, wherein the processor is configured to calculate the at least two processing frame durations responsive to sampling rates and sample number targets.

Embodiment 18: the system of Embodiments 16 and 17, wherein the processor is configured to: process data samples stored at the first frame buffer responsive to a processing algorithm and the first processing frame duration; and process data samples at the second frame buffer responsive to the processing algorithm and the second processing frame duration, wherein the first frame buffer and the second frame buffer are configured to store a uniform number of samples.

Embodiment 19: the system of Embodiments 16 through 18, further comprising an interface for communicating on an interconnect for operable coupling with a frame buffer interface, the first interface configured to enable/disable read/write access to the at least two frame buffers.

Embodiment 20: a system, comprising: first interfaces for communicating on a first interconnect for operably coupling with two or more data samples sources; a second interface for communicating on an interconnect for operably coupling with frame buffer regions defined in a memory of a processing system; input and output line buffers comprising packers and a first-in-first-out (FIFO) buffers; an interface controller for moving data samples from the input and output line buffers to the frame buffer regions defined in the memory, the interface controller configured to: configure the input line buffers for communication according to the second interface; configure the interconnect to move frames of data samples at the input line buffers to input locations at the frame buffer regions pointed at by input pointers, the input locations corresponding to frame buffers; detect that at least one frame buffer of the frame buffers is full; and notify the processing system that data samples is available at the at least one frame buffer responsive to the detection.

Embodiment 21: the system of Embodiment 20, wherein the interface controller is configured to configure the input and output line buffers for communication at the second interface responsive to configuration parameters, wherein the configuration parameters comprise a sample width and an interface width of the second interface.

Embodiment 22: the system of Embodiments 20 and 21, wherein the interface controller is configured to configure the interconnect to move the frames of data samples at the input line buffers to locations pointed at by input pointers by requesting write access to the addresses pointed at by the input pointers.

Embodiment 23: the system of Embodiments 20 through 22, wherein the interface controller is configured to detect that at least one frame buffer of the frame buffer regions is full comprises: incrementing a sample count responsive to moving data samples from a line buffer of the input line buffers to the at least one frame buffer; and detecting that the sample count is equal to or greater than a pre-defined sample count.

Embodiment 24: the system of Embodiments 20 through 23, wherein the interface controller is configured to: configure the output line buffers for communication at the second interface; and move processed data samples from output locations of the frame buffer regions to the output line buffers.

Embodiment 25: a system, comprising: a processing system for processing data samples sampled using different sampling rates using a processing frame duration; first interfaces for communicating on first interconnects for operable coupling with data samples sources at first data widths; second interfaces for communicating on second interconnects for operable coupling with data sinks at second data widths; a bus interface for communicating on an interconnect for operable coupling with the processing system at a third data width; and a buffer interface comprising an uplink channel handler and a downlink channel handler, wherein: the uplink channel handler is configured to receive data samples from the first interfaces at first data widths and provide the data samples to the bus interface at the third data widths; and the downlink channel handler is configured to receive processed data samples from the bus interface at third data widths and provide the processed data samples to the second interfaces at second data widths.

Embodiment 26: the system of Embodiment 25, wherein the uplink channel handler is configured to: receive first data samples sampled at a first sampling rate; provide the first data samples to the bus interface; and provide a processing frame ready message to the bus interface responsive to detecting providing a number of data samples of the first data samples corresponding to a processing frame duration.

Embodiment 27: the system of Embodiments 25 and 26, wherein the downlink channel handler is configured to: receive, from the bus interface, a first number of first processed data samples corresponding to a processing frame duration; provide the first processed data samples to the second interfaces at a first data rate; receive, from the bus interface, a second number of second processed data samples corresponding to the processing frame duration; and provide the second processed data samples to the second interfaces at a second data rate, the first data rate and the second data rate being different.

Embodiment 28: a method of moving data to and from a memory, comprising: determining processing frame parameters and data sampling parameters associated with active communication channels of an embedded system; allocating frame buffer regions of the memory responsive to one or more of the processing frame parameters and data sampling frame parameters; configuring output line buffers for communication over an interconnect that operatively couples the output line buffers to the frame buffer regions; moving processed data samples from the frame buffer regions to the output line buffers at output locations pointed at by output pointers; detecting that all contents of at least one frame buffer of the frame buffer regions has been moved; and notifying a processing system that the at least one frame buffer of the frame buffer region has been read.

Embodiment 29: the method of Embodiment 28, further comprising: configuring the output line buffers for communication over one or more interconnects that operatively couple the output line buffers to data sinks; and providing the processed data samples to the one or more interconnects.

What is claimed is:

1. An apparatus, comprising:
    first interfaces to communicate at first data widths via first interconnects for operative coupling with data samples sources;
    second interfaces to communicate at second data widths via second interconnects for operative coupling with data sinks,
    wherein the second interfaces are different than the first interfaces, the second data widths are different than the first data widths, and the second interconnects are different than the first interconnects;
    a bus interface to communicate at a third data width via a third interconnect for operative coupling with allocated memory regions utilized by a system to process data samples, the data samples sampled utilizing different sampling rates, according to processing frame durations,
    wherein the third data widths are different than the first data widths and the second data widths, and the third interconnects are different than the first interconnects and the second interconnects; and
    a buffer interface to communicate with the system to process data samples, the buffer interface comprising an uplink channel handler and a downlink channel handler,
    wherein the uplink channel handler to receive data samples from the first interfaces at first data widths and provide the data samples to the bus interface at third data widths, and
    wherein the downlink channel handler to receive processed data samples from the bus interface at third data widths and provide the processed data samples to the second interfaces at second data widths.

2. The apparatus of claim 1, wherein the buffer interface is to change a bit width of bits utilized to represent data samples to a predetermined bit width.

3. The apparatus of claim 2, wherein the buffer interface is to change an arrangement exhibited by bits having changed bit width to fit the third data width.

4. The apparatus of claim 1, wherein the buffer interface is to change an arrangement of bits utilized to represent processed data samples to fit a second data width.

5. The apparatus of claim 1, wherein the uplink channel handler is to:
    receive first data samples sampled at a first sampling rate;
    provide the first data samples to the bus interface; and
    provide a processing frame ready message to the bus interface at least partially responsive to detection of a provided number of data samples of the first data samples that corresponds to a processing frame duration.

6. The apparatus of claim 1, wherein the downlink channel handler is to:
    receive, from the bus interface, a number of first processed data samples corresponding to a processing frame duration;
    provide the first processed data samples to a second interface at a first of the second data widths;
    receive, from the bus interface, a number of second processed data samples corresponding to the processing frame duration; and
    provide the second processed data samples to a further second interface at a second of the second data widths, the first of the second data widths and the second of the second data widths being different.

7. The apparatus of claim 1, wherein a processing frame duration at least partially corresponds to a target sampling rate of data samples and a target quantity of data samples.

8. The apparatus of claim 7, wherein the target quantity of data samples and the target sampling rate of data samples are associated with a parameter of a data processing algorithm.

9. The apparatus of claim 8, wherein a parameter specifies a processing frame duration utilized by the data processing algorithm.

10. A method, comprising:
    receiving data samples from data sample sources via a first interface;
    providing data samples to a processing system via a buffer interface and further via a bus interface for communicating with allocated regions of memory utilized by the processing system to process data samples, the processing system to process data samples sampled using different sampling rates according to processing frame durations;
    receiving processed data from the processing system via the bus interface; and
    providing the processed data to data sinks via a second interface,
    wherein the second interface is different than the first interface,
    wherein the first interface for communicating at first data widths, the second interface for communicating at second data widths, the buffer interface for communicating at third data widths, and the bus interface for communicating at third data widths, wherein respective ones of the first data widths, second data widths, and third data widths are different.

11. The method of claim 10, comprising: changing a bit width of bits utilized to represent data samples to a predetermined bit width.

12. The method of claim 10, comprising changing an arrangement of bits having changed bit width to fit the third data width.

13. The method of claim 10, comprising an arrangement of bits utilized to represent the processed data to fit the second data width.

14. The method of claim 10, wherein a processing frame duration at least partially corresponds to a target sampling rate of data samples and a target quantity of data samples.

15. The method of claim 14, wherein the target quantity of data samples and the target sampling rate of data samples are associated with a parameter of a data processing algorithm.

16. The method of claim 15, wherein the parameter specifying a processing frame duration utilized by the data processing algorithm.

17. A system, comprising:
  a system to process data samples, the data samples sampled using different sampling rates according to processing frame durations;
  first interfaces to communicate at first data widths via first interconnects for operative coupling with data samples sources;
  second interfaces to communicate at second data widths via second interconnects for operative coupling with data sinks,
  wherein the second interfaces are different than the first interfaces, the second interconnects are different than the first interconnects, and the second data widths are different than the first data widths;
  a bus interface to communicate at a third data width via a third interconnect for operative coupling with allocated memory regions utilized by the system to process data samples,
  wherein the third data width is different than the first data widths and the second data widths;
  a buffer interface to communicate with the system to process data samples, the buffer interface comprising an uplink channel handler and a downlink channel handler,
  wherein the uplink channel handler to receive data samples from the first interfaces at first data widths and provide the data samples to the bus interface at third data widths, and
  wherein the downlink channel handler to receive processed data samples from the bus interface at third data widths and provide the processed data samples to the second interfaces at second data widths.

* * * * *

UNITED STATES PATENT AND TRADEMARK OFFICE
CERTIFICATE OF CORRECTION

PATENT NO. : 11,698,872 B2
APPLICATION NO. : 17/457185
DATED : July 11, 2023
INVENTOR(S) : Narendra Raj S V, Priyank Gupta and Michael Simmons It is certified that error appears in the above-identified patent and that said Letters Patent is hereby corrected as shown below:

On the Title Page
In ITEM (54), Line 1, change "WITH SYSTEMS, FOR" to --WITH SYSTEMS FOR--

In the Specification
Column 1, Line 1, change "WITH SYSTEMS, FOR" to --WITH SYSTEMS FOR--
Column 5, Line 31, change "frames—the" to --frames - the--
Column 6, Line 67, change "memory—e.g.," to --memory - e.g.,--
Column 8, Line 44, change "window—that is," to --window - that is,--
Column 9, Line 6, change "time—e.g.," to --time - e.g.,--
Column 15, Line 14, change "full—i.e.," to --full - i.e.,--
Column 17, Line 59, change "rate—e.g.," to --rate - e.g.,--
Column 17, Line 60, change "samples)±(8000" to --samples) ÷ (8000--
Column 19, Line 52, change "memory—for" to --memory - for--
Column 20, Line 1, change "list 800—or in the" to --list 800 - or in the--
Column 21, Line 1, change "and an $I^2S$—here" to --and an $I^2S$ - here--
Column 21, Line 10, change "DAC/DMI/$I^2S$—here" to --DAC/DMI/$I^2S$ - here--

Signed and Sealed this
Thirteenth Day of February, 2024

*Katherine Kelly Vidal*
Katherine Kelly Vidal
*Director of the United States Patent and Trademark Office*